US009974055B2

(12) United States Patent
Tan et al.

(10) Patent No.: US 9,974,055 B2
(45) Date of Patent: May 15, 2018

(54) METHOD FOR MANAGING FORWARDING PLANE TUNNEL RESOURCE UNDER CONTROL AND FORWARDING DECOUPLED ARCHITECTURE

(71) Applicant: Huawei Technologies Co., Ltd., Shenzhen (CN)

(72) Inventors: Shiyong Tan, Shenzhen (CN); Hui Ni, Shenzhen (CN); Hui Cai, Shenzhen (CN); Weihua Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 247 days.

(21) Appl. No.: 14/586,046

(22) Filed: Dec. 30, 2014

(65) Prior Publication Data

US 2015/0109901 A1 Apr. 23, 2015

Related U.S. Application Data

(63) Continuation of application No. PCT/CN2012/077995, filed on Jun. 30, 2012.

(51) Int. Cl.
*H04W 72/04* (2009.01)
*H04W 24/04* (2009.01)
*H04W 76/02* (2009.01)

(52) U.S. Cl.
CPC ....... *H04W 72/0406* (2013.01); *H04W 24/04* (2013.01); *H04W 76/022* (2013.01)

(58) Field of Classification Search
CPC .................... H04W 24/04; H04W 76/022
See application file for complete search history.

(56) References Cited

U.S. PATENT DOCUMENTS

| 2010/0067462 | A1* | 3/2010 | Beser ...................... H04L 45/00 370/329 |
| 2011/0075549 | A1 | 3/2011 | Lu et al. |
| 2014/0241247 | A1* | 8/2014 | Kempf ................ H04L 12/4633 370/328 |

FOREIGN PATENT DOCUMENTS

CN 101286941 A 10/2008

OTHER PUBLICATIONS

"3rd Generation Partnership Project; Technical Specification Group Core Network and Terminals; 3GPP Evolved Packet System (EPS); Evolved General Packet Radio Service (GPRS) Tunnelling Protocol for Control Plane (GTPv2-C; Stage 3 (Release 8)," Global System for Mobile Communications, 3GPP TS 29.274, V8.10.0, Jun. 2011, 148 pages.

(Continued)

*Primary Examiner* — Yemane Mesfin
*Assistant Examiner* — Henry Baron
(74) *Attorney, Agent, or Firm* — Brinks Gilson & Lione

(57) ABSTRACT

An embodiment of the present invention discloses a method and device for managing a forwarding plane tunnel resource, wherein the method includes: sending a forwarding plane tunnel resource request message to a forwarding plane device, for enabling the forwarding plane device to allocate a forwarding plane tunnel resource according to the forwarding plane tunnel resource request message; acquiring the allocated forwarding plane tunnel resource from the forwarding plane device; and sending the acquired forwarding plane tunnel resource to a target network element, to establish a packet data network connection with the target network element. By adopting the present invention, the load balancing of the forwarding plane device is achieved, the signaling interaction between the control plane device and the forwarding plane device is reduced as much as (Continued)

possible, and meanwhile, efficient failure processing can also be achieved in the case of a failure occurred in a device.

13 Claims, 13 Drawing Sheets

(56) References Cited

OTHER PUBLICATIONS

"3$^{rd}$ Generation Partnership Project; Technical Specification Group Core Network and Terminals; 3GPP Evolved Packet System (EPS); Evolved General Packet Radio Service (GPRS) Tunnelling Protocol for Control Plane (GTPv2-C; Stage 3 (Release 11)," Global System for Mobile Communications, 3GPP TS 29.274, V11.3.0, Jun. 2012, 219 pages.
"Universal Mobile Telecommunications System (UMTS); LTE; General Packet Radio System (GPRS) Tunnelling Protocol User Plane (GTPv1-U) (3GPP TS 29.281, V10.3.0 Release 10)," ETSI TS 129 281, V10.3.0, Oct. 2011, 27 pages.
"3$^{rd}$ Generation Partnership Project; Technical Specification Group Core Network and Terminals; General Packet Radio System (GPRS) Tunnelling Protocol User Plane (GTPv1-U) (Release 12)," Global System for Mobile Communications, 3GPP TS 29.281, V12.1.0, Dec. 2014, 27 pages.
"3$^{rd}$ Generation Partnership Project; Technical Specification Group Services and System Aspects; General Packet Radio Service (GPRS); Service Description; Stage 2 (Release 11)," Global System for Mobile Communications, 3GPP TS 23.060, V11.2.0, Jun. 2012, 335 pages.
"3$^{rd}$ Generation Partnership Project; Technical Specification Group Core Network and Terminals; General Packet Radio Service (GPRS); GPRS Tunnelling Protocol (GTP) across the Gn and Gp Interface (Release 11)," Global System for Mobile Communications, 3GPP TS 29.060, V11.3.0, Jun. 2012, 174 pages.
LTE, "3$^{rd}$ Generation Partnership Project; Technical Specification Group Core Network and Terminals; General Packet Radio System (GPRS) Tunnelling Protocol User Plane (GTPv1-U)" (Release 12) 3GPP TS 29.281, V12.1.0, Dec. 2014, 27 pages.
LTE, "3$^{rd}$ Generation Partnership Project; Technical Specification Group Core Network and Terminals; 3GPP Evolved Packet System (EPS); Evolved General Packet Radio Service (GPRS) Tunnelling Protocol for Control plane (GTPv2-C)" Stage 3 (Release 11), 3GPP TS 29.274, V11.3.0, Jun. 2012, 219 pages.
LTE, "3$^{rd}$ Generation Partnership Project; Technical Specification Group Core Network and Terminals; General Packet Radio Service (GPRS); GPRS Tunnelling Protocol (GTP) across the Gn and Gp interface" (Release 11) 3GPP TS 29.060, V11.3.0, Jun. 2012, 174 pages.
LTE, "3$^{rd}$ Generation Partnership Project; Technical Specification Group Services and System Aspects; General Packet Radio Service (GPRS); Service description" Stage 2 (Release 11) 3GPP TS 23.060, V11.2.0, Jun. 2012, 335 pages.
LTE, 3$^{rd}$ Generation Partnership Project; Technical Specification Group Core Network and Terminals; 3GPP Evolved Packet System (EPS); Evolved General Packet Radio Service (GPRS) Tunnelling Protocol for Control plane (GTPv2-C) Stage 3 (Release 8) 3GPP TS 29.274, V8.10.0, Jun. 2011, 148 pages.
ETSI, Universal Mobile Telecommunications System (UMTS); LTE; General Packet Radio System (GPRS) Tunnelling Protocol User Plane (GTPv1-U) (3GPP TS29.281 version 10.3.0 Release 10), Oct. 2011, 27 pages.

* cited by examiner

METHOD FOR MANAGING FORWARDING PLANE TUNNEL RESOURCE UNDER CONTROL AND FORWARDING DECOUPLED ARCHITECTURE

CROSS-REFERENCE TO RELATED APPLICATIONS

This application is a continuation of International Application No. PCT/CN2012/077995, filed on Jun. 30, 2012, which is hereby incorporated by reference in its entirety.

TECHNICAL FIELD

The present invention relates to the field of communications, and particularly, to a method for managing a forwarding plane tunnel resource under a control and forwarding decoupled architecture.

BACKGROUND

In a 2G/3G mobile packet network architecture under a traditional 3rd generation partnership project (3GPP) specification, network elements such as a serving GPRS support node (SGSN) and a gateway GPRS support node (GGSN) and the like are both responsible for processing various signaling and responsible for forwarding data. But in general, a universal computing platform is more suitable for processing control plane signaling, such as a mobility management, a session management and the like, and a dedicated hardware platform is very strong in processing a performance of user plane data forwarding, but the signaling processing performance is relatively weak. Therefore, in order to improve the user data forwarding throughput to the maximum, a gateway such as a GGSN or the like generally adopts a dedicated hardware platform. The SGSN is focused on processing control plane signaling and generally adopts the universal computing platform, which has a strong ability to process signaling and has a weak ability to forward data. Once user data traffic increases quickly, a capacity of the SGSN needs to be continually expanded or the number of the SGSNs needs to be greatly increased, thus the cost is very high.

To solve the above-mentioned technical problem, a decoupling of control and forwarding is proposed in the development process of a 3GPP mobile broadband network architecture. After being decoupled, a control plane and a forwarding plane may be upgraded and expanded independently, the control plane may be deployed and maintained centrally, and the forwarding plane may be distributed and deployed to optimize route. In R8 stage of a 3GPP standard version, a brand new system architecture evolution (SAE) network is developed, and the system architecture thereof is as shown in FIG. 1, wherein an evolved universal terrestrial radio access network (E-UTRAN) achieves all functions related to radio access of the evolution network, a mobility management entity (MME) is responsible for the mobility management of the control plane, including user context and mobile state management. A serving gateway S-GW is a user plane anchor point between 3GPP access networks and terminates an E-TURAN interface. A packet data network gateway (P-GW) is a user plane anchor point between a 3GPP access network and a non-3GPP access network and is an interface of an external PDN packet data network. A home subscriber server (HSS) stores user subscription information. The MME, the S-GW, the P-GW and the home subscriber server (HSS) constitute a core network, which is referred to as an evolved packet core (EPC). In the SAE architecture, the MME only needs to process the control plane signaling, the S-GW and the P-GW are mainly responsible for forwarding user plane data. The S-GW and the P-GW may be combined into a network element, which is generally referred to as a gateway.

With the development of a mobile internet service, an enrichment of an enterprise network service and an integration of a mobile access network with a variety of systems, a gateway device needs to gradually develop towards more sophisticated service control and charging on the basis of the completion of a basic data forwarding function, in order to support the implementation and control of more abundant services of an operator. But in the SAE architecture, the gateway still needs to keep a large number of external signaling interfaces. The large number of external signaling interfaces of the gateway will bring a large amount of interface signaling, and the signaling processing performance of a gateway using the dedicated hardware platform is not strong, which is liable to become a bottleneck. In order to process a large amount of interface signaling, the gateway is bound to increase a large amount of hardware on the basis of the dedicated hardware platform, such as a computing processor chip or the like, such that the hardware platform of the gateway device is very complicated and too high in cost, which is not conducive to the promotion and deployment of a mobile packet data network.

To solve the processing bottleneck problem of the gateway signaling processing, in the prior art, it is proposed that an interface signaling processing function and a user plane data forwarding function of the gateway are separated. The interface signaling processing function is deployed on a universal computing platform to become a control plane device, and the user plane data forwarding function is deployed on a dedicated hardware platform to become a forwarding plane device. The control plane device processes an external signaling interaction, including general packet radio service tunnellinging protocol-control (GTP-C) signaling with the MME and signaling with other network elements, such as signaling with an AAA (Authentication, Authorization, Accounting) server, policy and charging control (PCC) signaling with a policy and charging rules function (PCRF), etc. After finishing a signaling consultation, the control plane device forwards information (referred to as forwarding context) needed by the forwarding plane device for forwarding a data message to the forwarding plane device, and the forwarding plane device forwards a user data message according to context information indicated by the control plane device.

Taking a general packet radio service tunnelling protocol (GTP) bearer establishment in the case of 3GPP access under the SAE architecture as an example, since the principle that the signaling is processed by the control plane device is abided, the technical problem of the abovementioned control and forwarding decoupled solution of the existing gateway lie in that all GTP-C signaling for establishing a forwarding plane GTP bearer is processed by the control plane device, and a forwarding plane internet protocol (IP), a GTP tunnel end identifier (TEID) and a circuit switched identifier (CSID) are all allocated by the control plane, this will bring the following defects.

1) The control plane device has no idea about a load sharing relationship of internal processing units of the forwarding plane device or a mapping relationship of the forwarding plane IP and TEID and GTP protocol processing units in the forwarding plane device, so direct allocation of the control plane device will lead to a load imbalance of each GTP protocol processing unit of the forwarding plane device.

2) The control plane device allocates the forwarding plane IP and the TEID. When one forwarding plane device is controlled by multiple control plane devices, it may need to avoid a conflict between the multiple control plane devices, so that the implementation is complicated.

3) The forwarding plane device is a large-capacity device and still has a local failure condition, in the prior art, in a case that a local failure occurs in the forwarding plane device, the control plane device may be only notified by a large amount of signaling to delete GTP bearers influenced by the failure, and the control plane device notifies other network elements of deleting these GTP bearers through signaling one by one, thus generating a large amount of control signaling.

SUMMARY

The technical problem to be solved in the embodiments of the present invention is to provide a method for managing forwarding plane tunnel resources under a control and forwarding decoupled architecture, such that a forwarding plane device may achieve load balancing, and meanwhile in the case of a local failure of the device, may notify a control plane device and other peripheral network elements to delete related packet data network connections through a small amount of signaling.

On one hand, an embodiment of the present invention provide a method for managing a forwarding plane tunnel resource under a control and forwarding decoupled architecture, including:

sending a forwarding plane tunnel resource request message to a forwarding plane device, for enabling the forwarding plane device to allocate a forwarding plane tunnel resource according to the forwarding plane tunnel resource request message;

acquiring the allocated forwarding plane tunnel resource from the forwarding plane device; and sending the acquired forwarding plane tunnel resource to a target network element, to establish a packet data network connection with the target network element.

On one hand, an embodiment of the present invention further provide a method for managing a forwarding plane tunnel resource under a control and forwarding decoupled architecture, including:

acquiring a forwarding plane tunnel resource request message sent by a control plane device;

allocating a forwarding plane tunnel resource according to the forwarding plane tunnel resource request message;

sending the allocated forwarding plane tunnel resource to the control plane device, for enabling the control plane device to send the forwarding plane tunnel resource to a target network element to establish a packet data network connection with the target network element.

On one hand, an embodiment of the present invention further provide a control plane device for managing forwarding plane tunnel resources, including:

a tunnel resource requesting module, configured to send a forwarding plane tunnel resource request message to a forwarding plane device, for enabling the forwarding plane device to allocate a forwarding plane tunnel resource according to the forwarding plane tunnel resource request message;

a tunnel resource acquiring module, configured to acquire the allocated forwarding plane tunnel resource from the forwarding plane device; and a packet radio service tunnel establishing module, configured to send the acquired forwarding plane tunnel resource to a target network element, to establish a packet data network connection with the target network element.

On one hand, an embodiment of the present invention further provide a forwarding plane device for managing forwarding plane tunnel resources, including:

a tunnel request acquiring module, configured to acquire a forwarding plane tunnel resource request message sent by a control plane device;

a tunnel resource allocating module, configured to allocate a forwarding plane tunnel resource according to the forwarding plane tunnel resource request message; and a tunnel resource sending module, configured to send the allocated forwarding plane tunnel resource to the control plane device, for enabling the control plane device to send the forwarding plane tunnel resource to a target network element to establish a packet data network connection with the target network element.

On one hand, an embodiment of the present invention further provide a method for managing a forwarding plane tunnel resource under a control and forwarding decoupled architecture, including:

acquiring a set of forwarding plane tunnel resources of a forwarding plane device;

allocating a forwarding plane tunnel resource according to the acquired set of forwarding plane tunnel resources; and sending the allocated forwarding plane tunnel resource to a target network element, to establish a packet data network connection with the target network element.

On one hand, an embodiment of the present invention further provide a control plane device for managing a forwarding plane tunnel resource, including:

a forwarding plane information acquiring module, configured to acquire a set of forwarding plane tunnel resources of a forwarding plane device;

a tunnel resource allocating module, configured to allocate a forwarding plane tunnel resource according to the acquired set of forwarding plane tunnel resources; and a packet radio service tunnel establishing module, configured to send the allocated forwarding plane tunnel resource to a target network element, to establish a packet data network connection with the target network element.

On one hand, an embodiment of the present invention further provide a method for managing a forwarding plane tunnel resource under a control and forwarding decoupled architecture, including:

sending a set of forwarding plane tunnel resources of its own device to a control plane device, for enabling the control plane device to allocate a forwarding plane tunnel resource according to the set of forwarding plane tunnel resources and send the allocated forwarding plane tunnel resource to a target network element to establish a packet data network connection with the target network element.

On one hand, an embodiment of the present invention further provide a forwarding plane device for managing forwarding plane tunnel resources, including:

a forwarding plane information sending module, configured to send a set of forwarding plane tunnel resources of an own device to a control plane device, for enabling the control plane device to allocate a forwarding plane tunnel resource according to the set of forwarding plane tunnel resources and send the allocated forwarding plane tunnel resource to a target network element to establish a packet data network connection with the target network element.

On one hand, an embodiment of the present invention further provide a communication device under a control and forwarding decoupled architecture, including the control plane device and the forwarding plane device mentioned above.

On one hand, an embodiment of the present invention further provide a communication device under a control and forwarding decoupled architecture, including the control plane device and the forwarding plane device mentioned above.

The implementation of the embodiments of the present invention has the following the beneficial effects: by means of reasonable allocation of the forwarding plane tunnel resources, the load balancing of the forwarding plane device is achieved, the signaling interaction between the control plane device and the forwarding plane device is reduced as much as possible, and meanwhile, by maintaining the circuit switched identifiers of respective devices, efficient failure processing may be achieved in the case of a device failure.

BRIEF DESCRIPTION OF DRAWINGS

To illustrate technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other drawings may be obtained by those of ordinary skill in the art without any creative effort.

DETAILED DESCRIPTION OF EMBODIMENTS

A clear description of technical solutions in the embodiments of the present invention will be given below, in combination with the accompanying drawings in the embodiments of the present invention. Apparently, the embodiments described below are merely a part, but not all, of the embodiments of the present invention. All of other embodiments, obtained by those of ordinary skill in the art based on the embodiments of the present invention without any creative effort, fall into the protection scope of the present invention.

Figure 1:
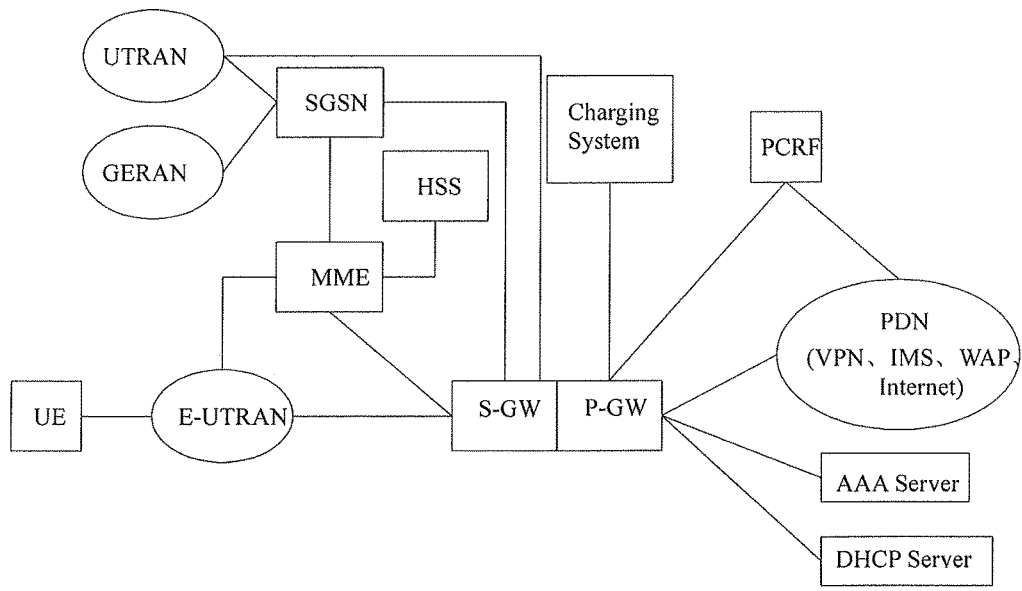
FIG. 1 is a schematic diagram of an SAE network architecture in prior art.
Figure 2:
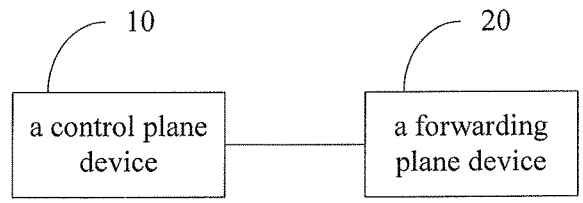
FIG. 2 is a schematic diagram of a structure of a communication device under a control and forwarding decoupled architecture in the present invention.

FIG. 2 is a schematic diagram of a structure of a communication device under a control and forwarding decoupled architecture in the present invention. The communication device under the control and forwarding decoupled architecture in the present invention may be implemented in a radio network controller (RNC), an SGSN and a GGSN in a GPRS network, or an evolved node B (eNodeB), an S-GW, a P-GW and an integrated device of the S-GW and the P-GW in an evolved packet system (EPS) network, or any control and forwarding decoupled GTP, proxy mobile IPv6 (PMIP, including a local mobility anchor LMA, Local Mobility Anchor and a mobile access gateway MAG, Mobile Access Gateway) protocol processing entirety. As shown in the figure, the communication device under the control and forwarding decoupled architecture in the present invention at least includes a control plane device 10 and a forwarding plane device 20, wherein in the first and second embodiments of the present invention, the control plane device 10 is configured to send a forwarding plane tunnel resource request message to a forwarding plane device, for enabling the forwarding plane device to allocate a forwarding plane tunnel resource according to the forwarding plane tunnel resource request message, acquire the allocated forwarding plane tunnel resource from the forwarding plane device, and send the acquired forwarding plane tunnel resource to a target network element to establish a packet data network connection with the target network element.

The forwarding plane device 20 is configured to acquire the forwarding plane tunnel resource request message sent by the control plane device, allocate the forwarding plane tunnel resource according to the forwarding plane tunnel resource request message, and send the allocated forwarding plane tunnel resource to the control plane device.

In the third embodiment of the present invention, the control plane device 10 is configured to acquire a set of forwarding plane tunnel resources of the forwarding plane device, allocate a forwarding plane tunnel resource according to the acquired set of forwarding plane tunnel resources, and send the allocated forwarding plane tunnel resource to the target network element to establish the packet data network connection with the target network element.

The forwarding plane device 20 is configured to send a set of forwarding plane tunnel resources of its own device to the control plane device.

Two embodiments in the present invention are illustrated below in detailed.

Figure 3:
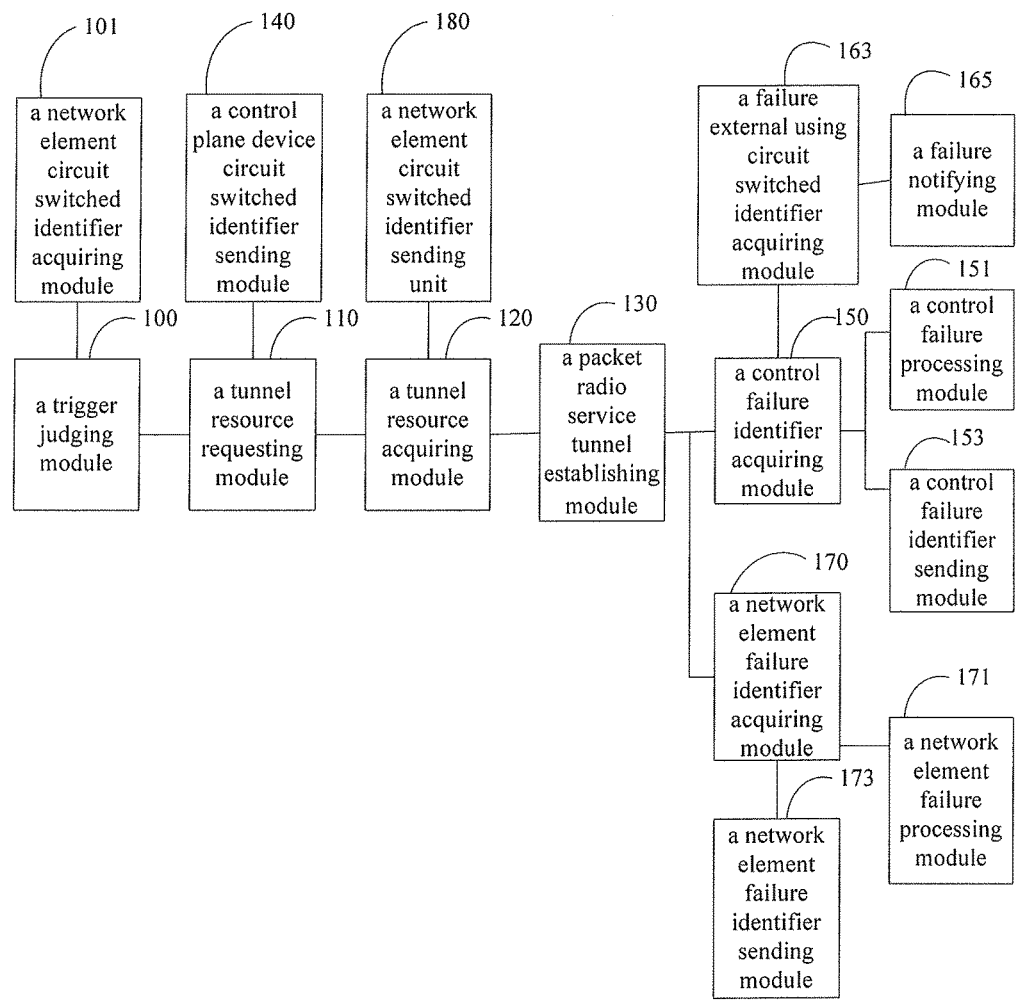
FIG. 3 is a schematic diagram of a structure of a control plane device for managing a forwarding plane tunnel resource in a first embodiment of the present invention.

FIG. 3 is a schematic diagram of a structure of a control plane device for managing a forwarding plane tunnel resource in a first embodiment of the present invention. The control plane device in the embodiment may be implemented in a radio network controller (RNC), an SGSN and a GGSN in a GPRS network, or an evolved node B (eNodeB), an S-GW, a P-GW and an integrated device of the S-GW and the P-GW in an evolved packet system (EPS) network, or any control and forwarding decoupled GTP, proxy mobile IPv6 (PMIP, including a local mobility anchor LMA, Local Mobility Anchor and a mobile access gateway MAG, Mobile Access Gateway) protocol processing entirety, and even may be completely separated from the forwarding plane device, for example, being singly implemented in an MME. The control plane device in the embodiment as shown in FIG. 3 may include the following modules.

A tunnel resource requesting module 110 is configured to send a forwarding plane tunnel resource request message to a forwarding plane device, for enabling the forwarding plane device to allocate a forwarding plane tunnel resource according to the forwarding plane tunnel resource request message. The forwarding plane tunnel resource request message at least may include a forwarding plane tunnel resource type necessary for establishing a target packet data network connection.

A tunnel resource acquiring module 120 is configured to acquire the allocated forwarding plane tunnel resource from the forwarding plane device. If the forwarding plane tunnel resource corresponds to a GTP protocol, then it may be forwarding plane IP and TEID, and if being corresponding to a PMIPv6 protocol, it is forwarding plane IP and a generic routing encapsulation (GRE) Key.

A packet radio service tunnel establishing module 130 is configured to send the acquired forwarding plane tunnel resource to a target network element, to establish a packet data network connection PDN connection with the target network element.

Furthermore, the control plane device may further include a trigger judging module 100, configured to judge, according to an external or internal trigger condition, whether the forwarding plane tunnel resource needs to be allocated or not. Specifically, the external trigger condition may be that the control plane device is triggered by such signaling negotiation as external GTP-C, PMIP, PCC or the like, and the internal trigger condition is that the control plane device is triggered inside a network element device where the control plane device is located. When the trigger judging module 100 judges that the external or internal trigger condition is satisfied, the tunnel resource requesting module 110 sends the forwarding plane tunnel resource request message to the forwarding plane device according to the satisfied trigger condition, for enabling the forwarding plane device to allocate the forwarding plane tunnel resource corresponding to the satisfied trigger condition. For example, the satisfied trigger condition is an external GTP-C signaling negotiation, then the forwarding plane tunnel resource request message sent by the tunnel resource requesting module 110 to the forwarding plane device needs to request the forwarding plane device to allocate a corresponding GTP tunnel. If the satisfied trigger condition is an external PMIP signaling negotiation, then the forwarding plane tunnel resource request message sent by the tunnel resource requesting module 110 to the forwarding plane device needs to request the forwarding plane device to allocate a PMIPv6 session.

Optionally, the control plane device may further include the following modules.

A control failure identifier acquiring module 150 is configured to acquire, when detecting a failure occurs in itself, a control plane device circuit switched identifier CSID (for convenience of description, CSID-C is configured to express the control plane device circuit switched identifier hereafter) corresponding to the failure. The CSID-C corresponds to a certain GTP protocol processing unit or a PMIP protocol processing unit in the control plane device, for example, may correspond to a cabinet, a frame, a single board, a CPU, a certain core, process or thread of a multi-core CPU and the like.

A control failure processing module 151 is configured to delete all packet data network connections corresponding to the control plane device circuit switched identifier corresponding to the failure.

Optionally, the packet radio service tunnel establishing module 130 is further configured to send an external using circuit switched identifier (for convenience of description, CSID-E is configured to express the external using circuit switched identifier hereafter) corresponding to the forwarding plane tunnel resource to the target network element. The CSID-E in the embodiment is the CSID-C, and the packet radio service tunnel establishing module 130 acquires the CSID-C corresponding to the forwarding plane tunnel resource and the CSID-C serves as CSID-E to send it to the target network element.

And then, the control plane device may further include the following modules.

A failure external using circuit switched identifier acquiring module 163 is configured to acquire, when detecting a failure in itself, an external using circuit switched identifier corresponding to the control plane device circuit switched identifier corresponding to the failure, namely, a failure external using circuit switched identifier. The failure external using circuit switched identifier in the embodiment is the control plane device circuit switched identifier corresponding to the failure.

A failure notifying module 165 is configured to send the failure external using circuit switched identifier acquired by the failure external using circuit switched identifier acquiring module 163 to a target network element associated with the failure external using circuit switched identifier, for enabling the target network element associated with the failure external using circuit switched identifier to delete all packet data network connections corresponding to the failure external using circuit switched identifier.

Optionally, the control plane device may further include the following module.

A control plane device circuit switched identifier sending module 140 is configured to send the control plane device circuit switched identifier corresponding to the forwarding plane tunnel resource request message to the forwarding plane device. In other embodiments, the tunnel resource requesting module 110 and the control plane device circuit switched identifier sending module 140 may be integrated in one module for implementation.

And then, the control plane device may further include the following module.

A control failure identifier sending module 153 is configured to send the control plane device circuit switched identifier, corresponding to the failure and acquired by the control failure identifier acquiring module 150, to the forwarding plane device, for enabling the forwarding plane device to delete all packet data network connections corresponding to the control plane device circuit switched identifier corresponding to the failure. The deletion of all PDN connections mentioned herein includes deletion of all GTP bearers and PMIP sessions or the like corresponding to the PDN connections.

Optionally, the control plane device may further include the following module.

A network element circuit switched identifier acquiring module 101 is configured to acquire an external using circuit switched identifier of the target network element corresponding to the forwarding plane tunnel resource. The network element circuit switched identifier acquiring module 101 may acquire the CSID-E of the target network element through a signaling negotiation with the target network element. In other embodiment, the network element circuit switched identifier acquiring module 101 may be integrated with the trigger judging module 100 in a module for implementation.

And then, the control plane device may further include the following modules.

A network element failure identifier acquiring module 170 is configured to acquire an external using circuit switched identifier corresponding to the failure occurred in the target network element, namely a failure external using circuit switched identifier of the target network element. When sending the failure, the target network element will send a CSID-E corresponding to the failure thereof to the control plane device, and the network element failure identifier acquiring module 170 receives the CSID-E sent by the target network element and corresponding to the failure thereof.

A network element failure processing module 171 is configured to delete all packet data network connections corresponding to the failure external using circuit switched identifier of the target network element.

Optionally, the control plane device may further include:

a network element circuit switched identifier sending unit 180, configured to send the external using circuit switched identifier of the target network element corresponding to the forwarding plane tunnel resource to the forwarding plane device.

And then, the control plane device may further include:

a network element failure identifier sending module 173, configured to send the failure external using circuit switched identifier of the target network element, acquired by the network element failure identifier acquiring module 170, to the forwarding plane device, for enabling the forwarding plane device to delete all the packet data network connections corresponding to the failure external using circuit switched identifier of the target network element.

Figure 4:
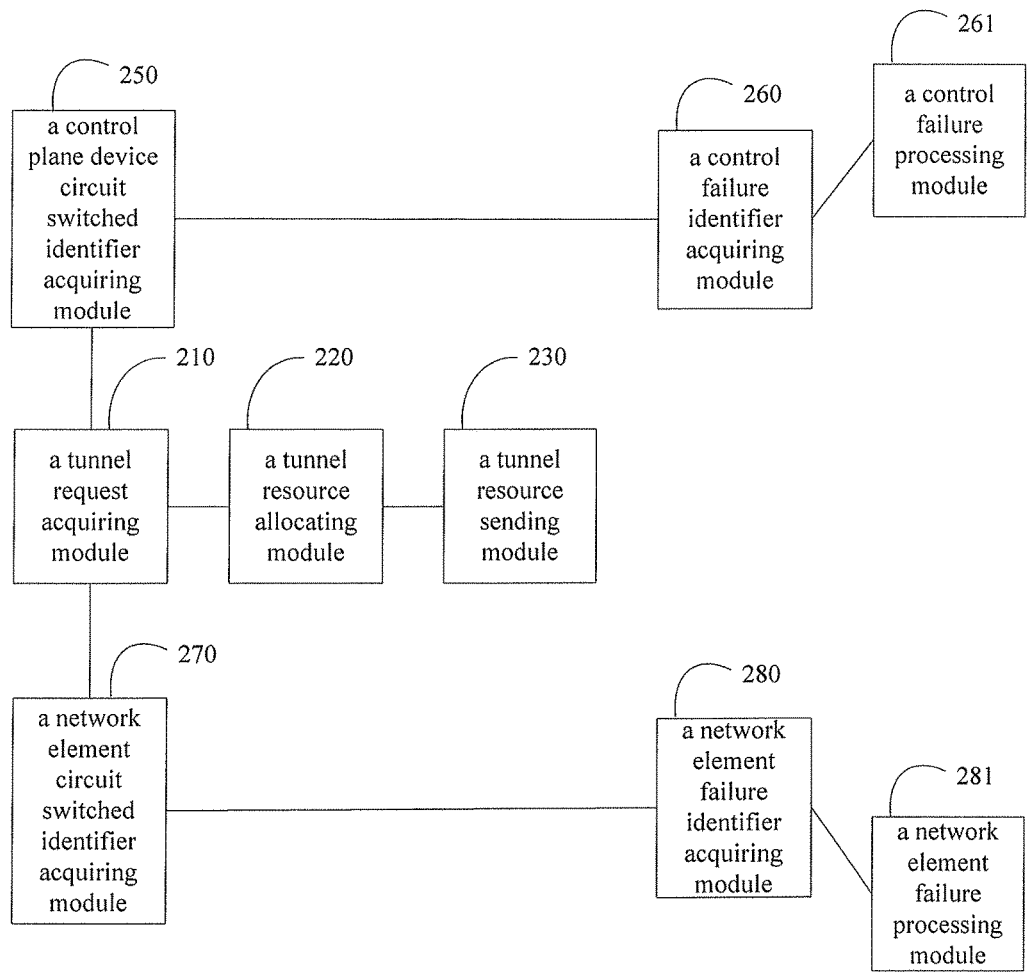
FIG. 4 is a schematic diagram of a structure of a forwarding plane device for managing a forwarding plane tunnel resource in a first embodiment of the present invention.

FIG. 4 is a schematic diagram of a structure of a forwarding plane device for managing a forwarding plane tunnel resource in a first embodiment of the present invention. The forwarding plane device in the embodiment may be implemented, under a control and forwarding decoupled architecture, in an RNC, an SGSN and a GGSN in a CPRS network or an eNodeB, an S-GW, a P-GW and an integrated device of the S-GW and the P-GW in an EPS network, or any control and forwarding decoupled GTP, PMIP protocol processing entirety. The forwarding plane device in the embodiment as shown in FIG. 4 may include the following modules.

A tunnel request acquiring module 210 is configured to acquire a forwarding plane tunnel resource request message sent by a control plane device. The forwarding plane tunnel resource request message at least may include a forwarding plane tunnel resource type necessary for establishing a target packet data network connection.

A tunnel resource allocating module 220 is configured to allocate a forwarding plane tunnel resource according to the forwarding plane tunnel resource request message. The tunnel resource allocating module 220 may allocate the forwarding plane tunnel resource according to the forwarding plane tunnel resource request message and the internal load of the forwarding plane device, so as to achieve a load balancing of the forwarding plane device.

A tunnel resource sending module 230 is configured to send the allocated forwarding plane tunnel resource to the control plane device, for enabling the control plane device to send the forwarding plane tunnel resource to a target network element, so as to establish a packet data network connection with the target network element.

Optionally, the forwarding plane device may further include:

a control plane device circuit switched identifier acquiring module 250, configured to acquire a control plane device circuit switched identifier corresponding to the forwarding plane tunnel resource request message from the control plane device. In other embodiment, the control plane device circuit switched identifier acquiring module 250 may be integrated with the tunnel request acquiring module 210 in a module for implementation.

And then, the forwarding plane device may further include the following modules.

A control failure identifier acquiring module 260 is configured to acquire a control plane device circuit switched identifier corresponding to a failure occurred in the control plane device. When sending the failure, the control plane device will send a CSID-C corresponding to the failure thereof, and the control failure identifier acquiring module 260 acquires the CSID-C corresponding to the failure, sent by the control plane device.

A control failure processing module 261 is configured to delete all packet data network connections corresponding to the control plane device circuit switched identifier corresponding to the failure of the control plane device.

Optionally, the forwarding plane device may further include:

a network element circuit switched identifier acquiring module 270, configured to acquire an external using circuit switched identifier of the target network element from the control plane device. In other embodiment, the network element circuit switched identifier acquiring module 270 may be integrated with the tunnel request acquiring module 210 in a module for implementation.

And then, the forwarding plane device may further include the following modules.

A network element failure identifier acquiring module 280, configured to acquire an external using circuit switched identifier corresponding to the failure occurred in the target network element, namely a failure external using circuit switched identifier of the target network element, from the control plane device. When sending the failure, the target network element will send a CSID-E corresponding to the failure thereof to the control plane device, after receiving the CSID-E, the control plane device will forward it to the forwarding plane device, and the network element failure identifier acquiring module 280 acquires the CSID-E corresponding to the failure of the target network element.

A network element failure processing module 281 is configured to delete all packet data network connections corresponding to the failure external using circuit switched identifier of the target network element.

Figure 5:
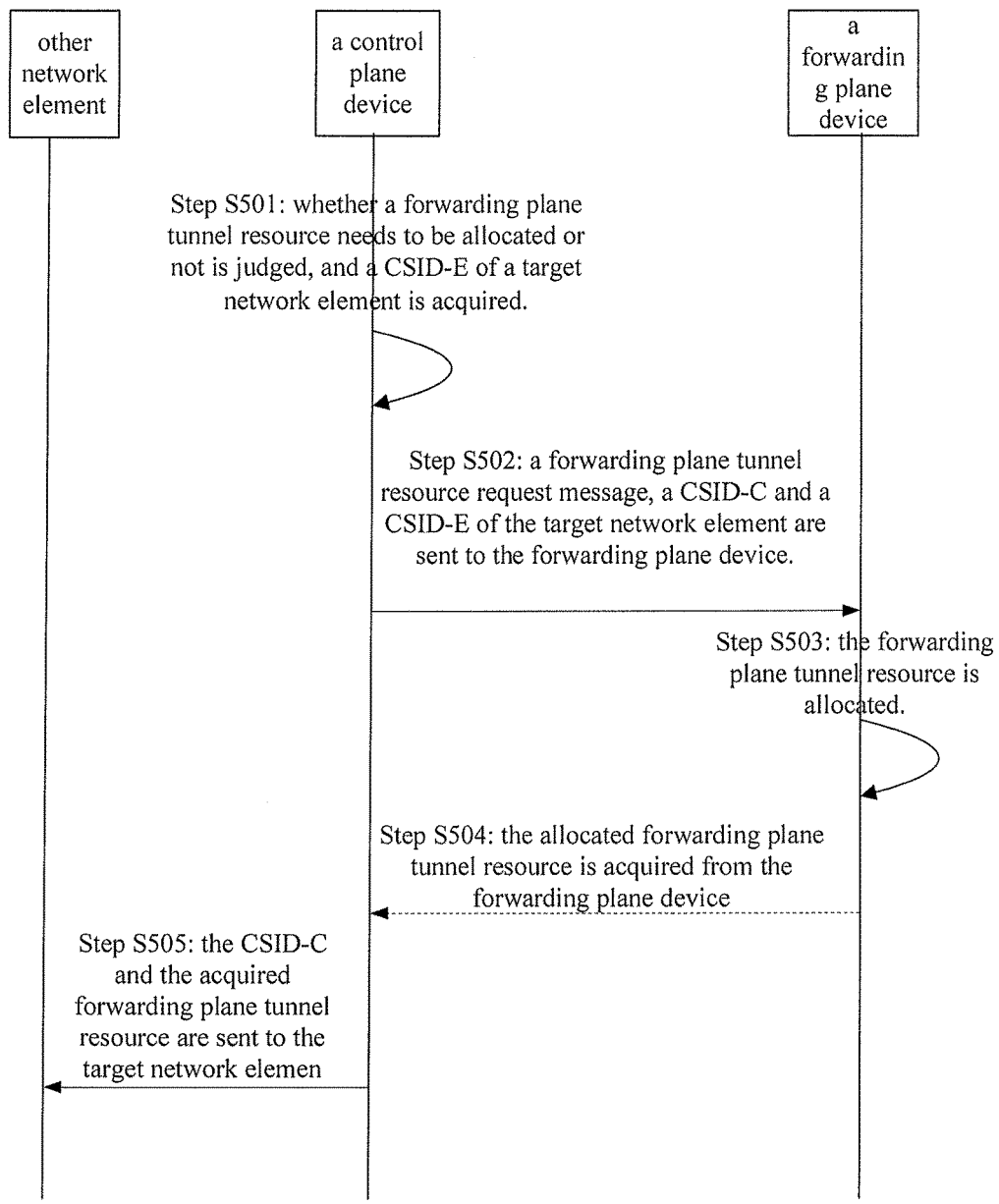
FIG. 5 is a schematic diagram of a flow of establishing a packet data network connection in a method for managing a forwarding plane tunnel resource under a control and forwarding decoupled architecture in a first embodiment of the present invention.

FIG. 5 is a flow of a method for establishing a packet data network connection in a first embodiment of the present invention. The flow may be implemented, under a control and forwarding decoupled architecture, in an RNC, an SGSN and a GGSN in a GPRS network or an eNodeB, an S-GW, a P-GW and an integrated device of the S-GW and the P-GW in an EPS network, or any control and forwarding decoupled GTP, PMIP protocol processing entirety. The flow of the method for establishing the packet data network connection as shown in FIG. 5 includes the following steps.

Step S501: a control plane device judges, according to an external or internal trigger condition, whether a forwarding plane tunnel resource needs to be allocated or not, and when judging the external or internal trigger condition is satisfied, an external using circuit switched identifier of a target network element corresponding to a forwarding plane tunnel resource request message is acquired. Specifically, the external trigger condition may be that the control plane device is triggered by such signaling negotiation as external GTP-C, PMIP, PCC or the like, and the internal trigger condition is that the control plane device is triggered inside a network element device where the control plane device is located. In other embodiment, the acquiring the CSID-E of the target network element may be implemented at any moment after step S501 by performing signaling negotiation with the target network element.

Step S502: the control plane device sends the forwarding plane tunnel resource request message, a CSID-C corresponding to the forwarding plane tunnel resource request message and the CSID-E of the target network element to the forwarding plane device. Specifically, the forwarding plane tunnel resource request message may at least include a forwarding plane tunnel resource type necessary for establishing a target packet data network connection. When judging the external or internal trigger condition is satisfied, the control plane device may send the forwarding plane tunnel resource request message to the forwarding plane device according to the satisfied trigger condition, for enabling the forwarding plane device to allocate a forwarding plane tunnel resource corresponding to the satisfied trigger condition. For example, if the satisfied trigger condition is an external GTP-C signaling negotiation, then the forwarding plane tunnel resource request message sent by the control plane device to the forwarding plane device needs to request the forwarding plane device to allocate a corresponding GTP tunnel. If the satisfied trigger condition is an external PMIP signaling negotiation, then the forwarding plane tunnel resource request message sent by the tunnel resource requesting module 110 to the forwarding plane device needs to request the forwarding plane device to allocate a PMIPv6 session. In other embodiment, the sending the CSID-C corresponding to the forwarding plane tunnel resource request message and the CSID-E of the target network element to the forwarding plane device may also be implemented at any moment after step S502.

Step S503: the forwarding plane device allocates the forwarding plane tunnel resource according to the forwarding plane tunnel resource request message. The forwarding plane device may allocate the forwarding plane tunnel resource according to the forwarding plane tunnel resource request message and the internal load of the forwarding plane device, so as to achieve load balancing of the forwarding plane device. If the forwarding plane tunnel resource corresponds to a GTP protocol, then it may be forwarding plane IP and TEID, and if corresponding to a PMIPv6 protocol, it is forwarding plane IP and a generic routing encapsulation (GRE) Key.

Step S504: the control plane device acquires the allocated forwarding plane tunnel resource from the forwarding plane device.

Step S505: the control plane device sends the CSID-C and the acquired forwarding plane tunnel resource to the target network element, to establish a packet data network connection with the target network element. In the embodiment, the CSID-C is used as CSID-E.

Figure 6:
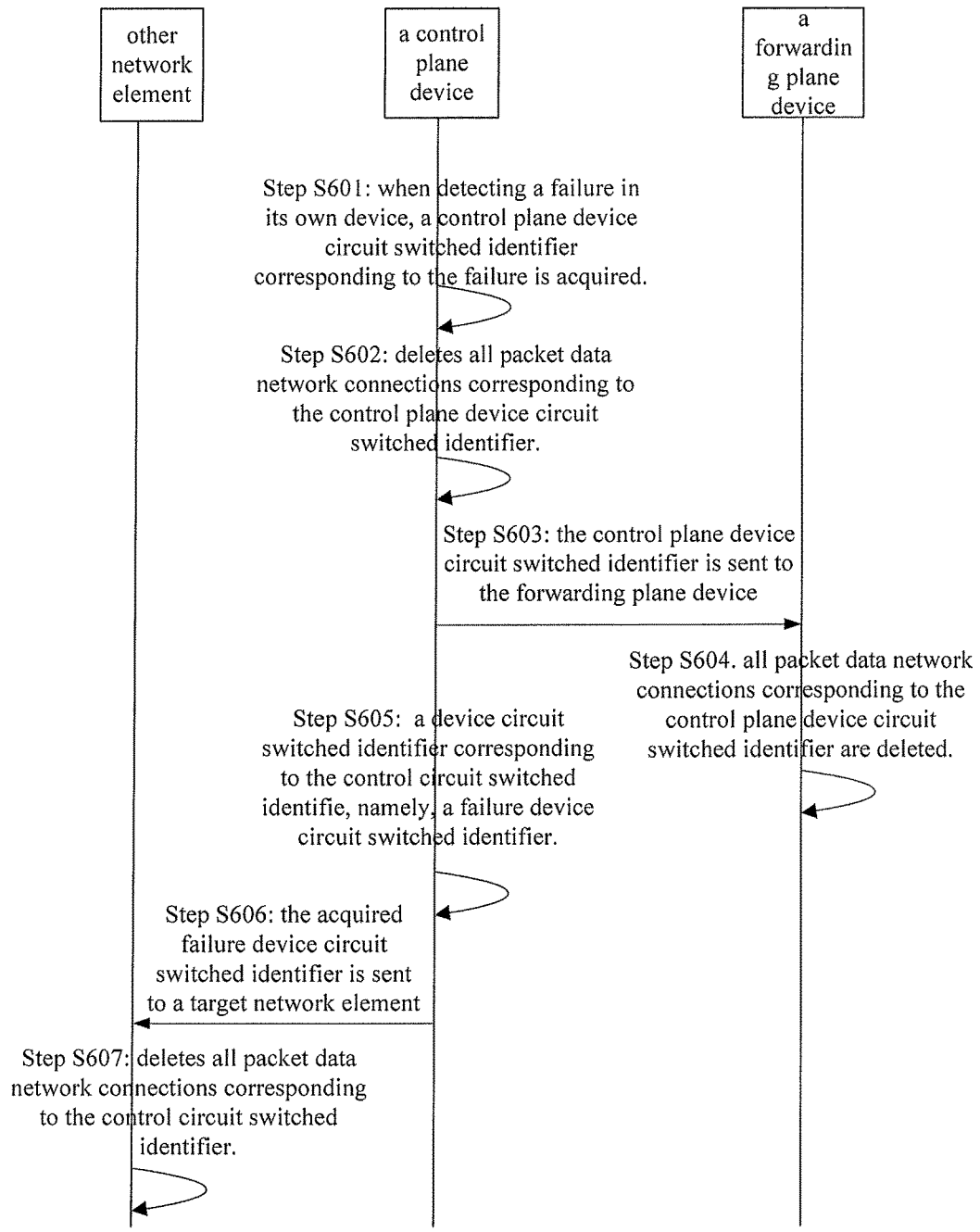
FIG. 6 is a schematic diagram of a flow of a failure processing method in the case of a failure occurred in a control plane device in a method for managing a forwarding plane tunnel resource under a control and forwarding decoupled architecture in a first embodiment of the present invention.

FIG. 6 is a schematic diagram of a flow of a failure processing method in the case of a failure occurred in a control plane device in a method for managing a forwarding plane tunnel resource under a control and forwarding decoupled architecture in a first embodiment of the present invention. The flow is implemented after the steps in FIG. 5 are executed. The failure processing flow as shown in FIG. 6 includes the following steps.

Step S601: when detecting a failure in itself, a control plane device acquires a control plane device circuit switched identifier corresponding to the failure. The CSID-C corresponds to a certain GTP protocol processing unit or a PMIP protocol processing unit in the control plane device, for example, it may correspond to a cabinet, a frame, a single board, a CPU, a certain core, process or thread of a multi-core CPU and the like. When these protocol processing units in the control plane device fail, the control plane device may acquire the CSID-C corresponding to the failure.

Step S602: the control plane device deletes all packet data network connections corresponding to the control plane device circuit switched identifier corresponding to the failure.

Step S603: the control plane device sends the control plane device circuit switched identifier corresponding to the failure to the forwarding plane device.

Step S604: the forwarding plane device deletes all packet data network connections corresponding to the control plane device circuit switched identifier corresponding to the failure of the control plane device.

Step S605: the control plane device acquires an external using circuit switched identifier corresponding to the control plane device circuit switched identifier corresponding to the failure, namely, a failure external using circuit switched identifier. The CSID-E in the embodiment is the CSID-C, thus acquisition of the CSID-E corresponding to the failure is acquisition of the CSID-C corresponding to the failure.

Step S606: the control plane device sends the failure external using circuit switched identifier to a target network element associated with the failure external using circuit switched identifier. The control plane device may firstly search the target network element of the packet data network connection, established by using the CSID-E corresponding to the failure, namely, the target network element associated with the CSID-E corresponding to the failure, and then, send the failure external using circuit switched identifier to the associated target network element.

Step S607: the target network element deletes all packet data network connections corresponding to the failure external using circuit switched identifier.

In other embodiment, the sequence of the three groups of steps, namely, step S602, step S603 to step S604, and step S605 to step S607 may be mutually exchanged randomly without influencing the implementation effect of the present invention.

Figure 7:
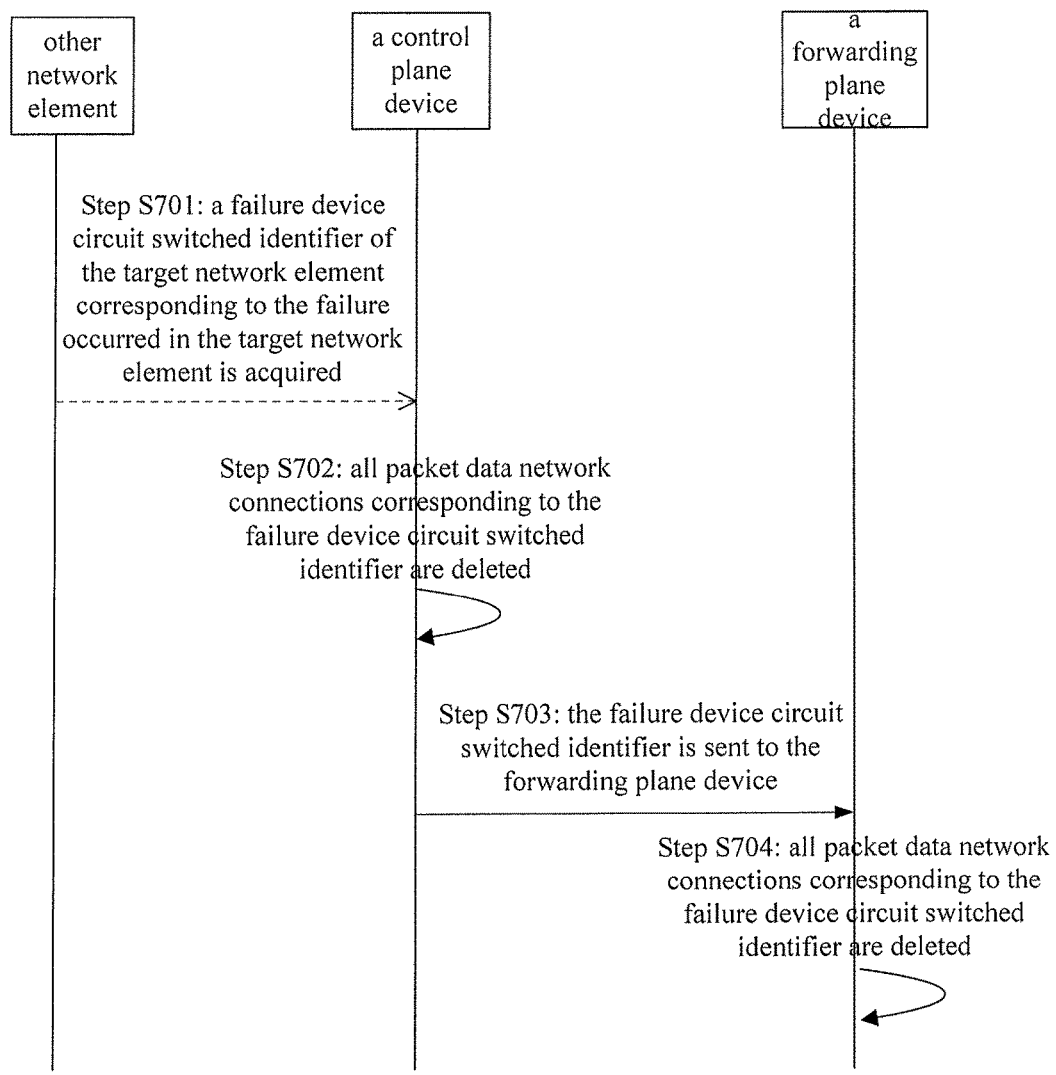
FIG. 7 is a schematic diagram of a flow of a failure processing method in the case of a failure occurred in a target network element in a method for managing a forwarding plane tunnel resource under a control and forwarding decoupled architecture in a first embodiment of the present invention.

FIG. 7 is a schematic diagram of a flow of a failure processing method in the case of a failure occurred in a target network element in a method for managing a forwarding plane tunnel resource under a control and forwarding decoupled architecture in a first embodiment of the present invention. The flow is implemented after the steps in FIG. 5 are executed. The failure processing flow as shown in FIG. 7 includes the following steps.

Step S701: a control plane device acquires an external using circuit switched identifier corresponding to a failure occurred in the target network element, namely, a failure external using circuit switched identifier of the target network element.

Step S702: the control plane device deletes all packet data network connections corresponding to the failure external using circuit switched identifier of the target network element.

Step S703: the failure external using circuit switched identifier of the target network element is sent to the forwarding plane device.

Step S704: the forwarding plane device deletes all packet data network connections corresponding to the failure external using circuit switched identifier of the target network element.

Figure 8:
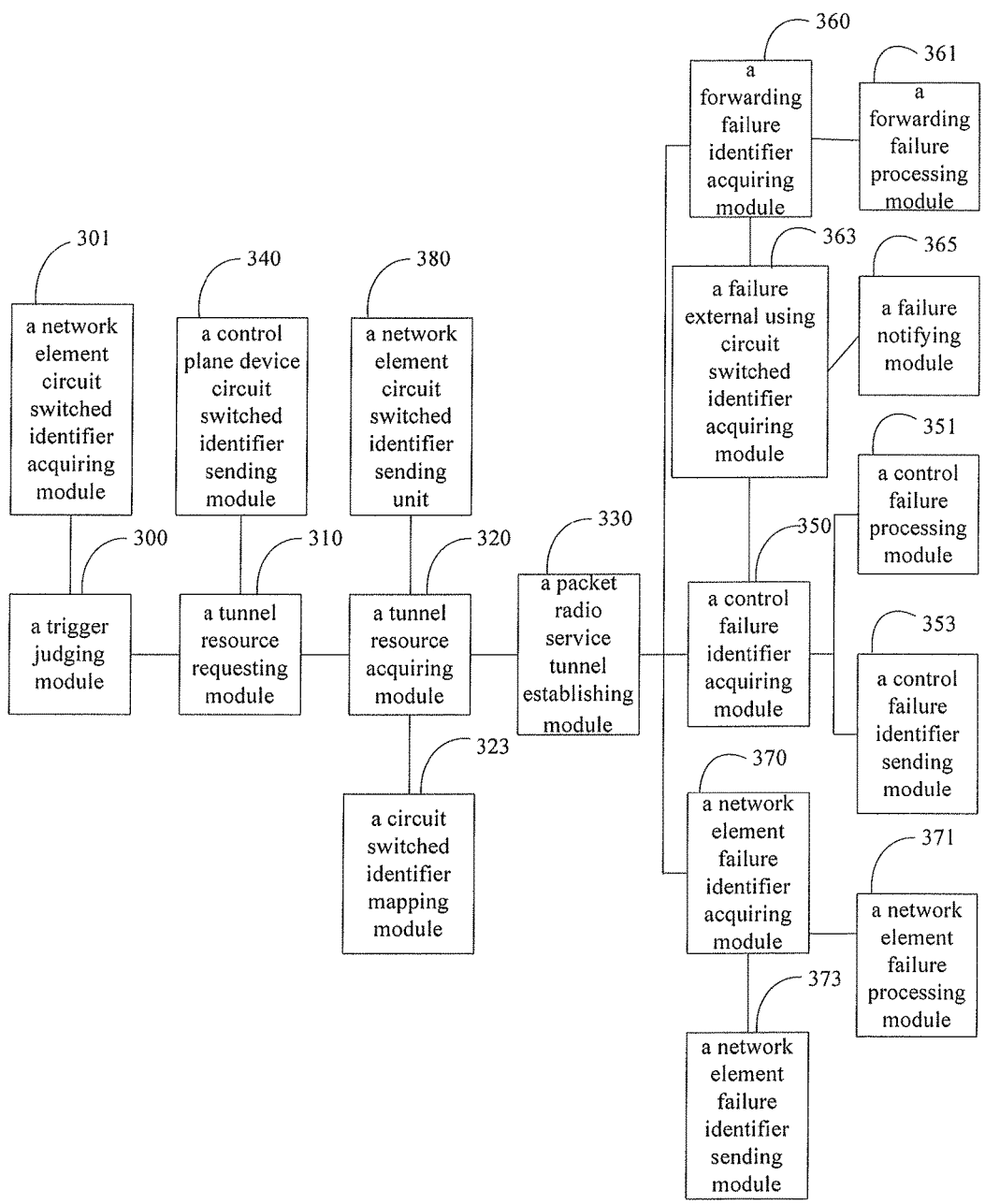
FIG. 8 is a schematic diagram of a structure of a control plane device for managing a forwarding plane tunnel resource in a second embodiment of the present invention.

The difference of the second embodiment and the first embodiment lies in that, the forwarding plane device in the second embodiment independently maintains its own CSID-U, so that when the forwarding plane device fails, the failure may be handled quickly. FIG. 8 is a schematic diagram of a structure of a control plane device for managing a forwarding plane tunnel resource in the second embodiment of the present invention. The implementation scenario of the control plane device in the embodiment is the same as that of the control plane device in the first embodiment. As shown in the figure, the control plane device in the embodiment may include the following modules.

A trigger judging module 300 and a tunnel resource requesting module 310 are the same as the trigger judging module 100 and the tunnel resource requesting module 110 in the first embodiment, which will not be repeated redundantly herein.

A tunnel resource acquiring module 320 is configured to acquire the allocated forwarding plane tunnel resource from the forwarding plane device, as well as acquire a forwarding plane device circuit switched identifier, corresponding to the forwarding plane tunnel resource, of the forwarding plane device.

A packet radio service tunnel establishing module 330 is configured to send the acquired forwarding plane tunnel resource to a target network element, to establish a packet data network connection PDN connection with the target network element. A packet radio service tunnel establishing module 330 is further used to send an external using circuit switched identifier corresponding to the forwarding plane tunnel resource to the target network element. In the embodiment, the CSID-E sent by the packet radio service tunnel establishing module 330 to the target network element is acquired by a circuit switched identifier mapping module 323 by mapping.

The circuit switched identifier mapping module 323 is configured to acquire a CSID-C corresponding to the forwarding plane tunnel resource request message of the control plane device and map the CSID-C corresponding to the forwarding plane tunnel resource and a CSID-U acquired by the tunnel resource acquiring module 320 to acquire the CSID-E corresponding to the forwarding plane tunnel resource.

A control plane device circuit switched identifier sending module 340, a control failure identifier acquiring module 350, a control failure processing module 351, a control failure identifier sending module 353, a network element circuit switched identifier acquiring module 301, a network element failure identifier acquiring module 370, a network element failure processing module 371, a network element circuit switched identifier sending unit 380 and a network element failure identifier sending module 373 are respectively the same as the corresponding modules in the embodiment, and will not be repeated redundantly herein.

The control plane device in the embodiment further includes the following modules.

A forwarding failure identifier acquiring module 360 is configured to acquire, when the forwarding plane device fails, a forwarding plane device circuit switched identifier corresponding to the failure thereof from the forwarding plane device.

A forwarding failure processing module 361 is configured to delete all packet data network connections corresponding to the forwarding plane device circuit switched identifier corresponding to the failure of the forwarding plane device.

A failure external using circuit switched identifier acquiring module 363 is configured to acquire, when the control failure identifier acquiring module 350 acquires the control plane device circuit switched identifier corresponding to the failure of the control plane device, an external using circuit switched identifier corresponding to the control plane device circuit switched identifier corresponding to the failure of the control plane device, or acquire, when the forwarding failure identifier acquiring module 360 acquires the forwarding plane device circuit switched identifier corresponding to the failure of the forwarding plane device, an external using circuit switched identifier corresponding to the forwarding plane device circuit switched identifier corresponding to the failure of the forwarding plane device, wherein the difference of the CSID-E in the embodiment with that in the first embodiment is no longer being the same as the CSID-C, but the CSID-E is acquired by mapping the CSID-C and the CSID-U corresponding to the same forwarding plane tunnel resource, therefore, if the CSID-C or CSID-U corresponding to the failure is acquired, a unique CSID-E may be acquired.

A failure notifying module 365 is configured to send the external using circuit switched identifier corresponding to the forwarding plane device circuit switched identifier corresponding to the failure occurred in the forwarding plane device, acquired by the failure external using circuit switched identifier acquiring module 363, or the external using circuit switched identifier corresponding to the control plane device circuit switched identifier corresponding to the failure of the control plane device, to the target network element associated with the failure external using circuit switched identifier. Specifically, the failure notifying module 365 may find out the target network element associated with the CSID-E according to the CSID-E acquired by the failure external using circuit switched identifier acquiring module 363, and then send the CSID-E to the associated target network element.

Figure 9:
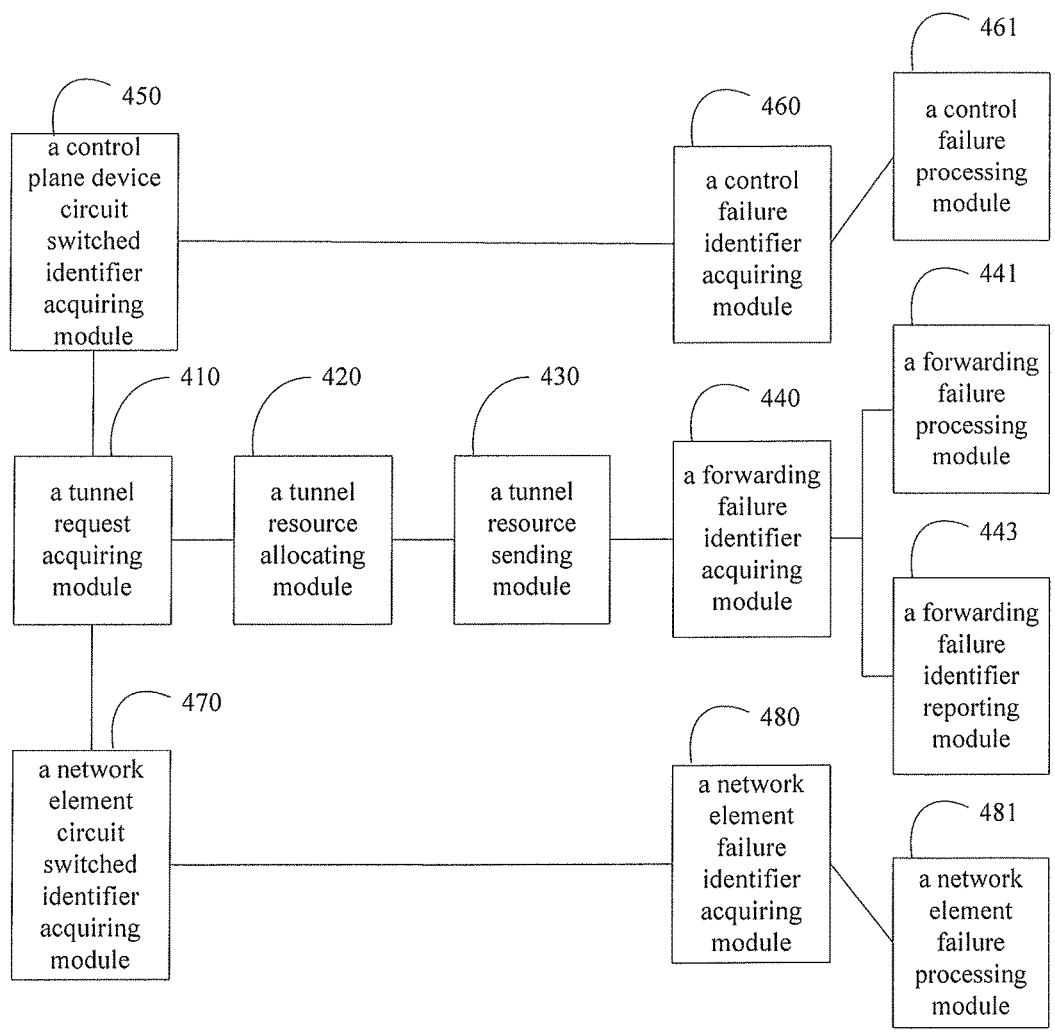
FIG. 9 is a schematic diagram of a structure of a forwarding plane device for managing a forwarding plane tunnel resource in a second embodiment of the present invention.

FIG. 9 is a schematic diagram of a structure of a forwarding plane device for managing a forwarding plane tunnel resource in a second embodiment of the present invention. The implementation scenario of the forwarding plane device in the embodiment is the same as that of the forwarding plane device in the first embodiment. As shown in the figure, the forwarding plane device in the embodiment may include the following modules.

A tunnel request acquiring module 410 and a tunnel resource allocating module 420 the same as the tunnel request acquiring module 210 and the tunnel resource allocating module 220 in the first embodiment, which will not be repeated redundantly herein.

A tunnel resource sending module 430 is configured to send a forwarding plane tunnel resource allocated by the tunnel resource allocating module 420 and a forwarding plane device circuit switched identifier corresponding to the forwarding plane tunnel resource, to the control plane device.

A control plane device circuit switched identifier acquiring module 450, a control failure identifier acquiring module 460, a control failure processing module 461, a network element circuit switched identifier acquiring module 470, a network element failure identifier acquiring module 480 and a network element failure processing module 481 are respectively the same as the corresponding modules in the first embodiment, and will not be repeated redundantly herein.

The forwarding plane device in the embodiment may further include the following modules.

A forwarding failure identifier acquiring module 440 is configured to acquire, when detecting a failure occurs in its own device, a forwarding plane device circuit switched identifier corresponding to the failure. The CSID-U corresponds to a certain GTP protocol processing unit or a PMIP protocol processing unit in the forwarding plane device, for example, may correspond to a cabinet, a frame, a single board, a CPU, a certain core, process or thread of a multi-core CPU and the like. When these protocol processing units in the forwarding plane device fail, the forwarding failure identifier acquiring module 440 may acquire the CSID-U corresponding to the failure.

A forwarding failure processing module 441 is configured to delete all packet data network connections corresponding to the forwarding plane device circuit switched identifier corresponding to the failure of the forwarding plane device.

A forwarding failure identifier reporting module 443 is configured to send the forwarding plane device circuit switched identifier corresponding to the failure to the control plane device, for enabling the control plane device to delete all packet data network connections corresponding to the control plane device circuit switched identifier corresponding to the failure, and for enabling the control plane device to send an external using circuit switched identifier corresponding to the forwarding plane resource to the target network element.

Figure 10:
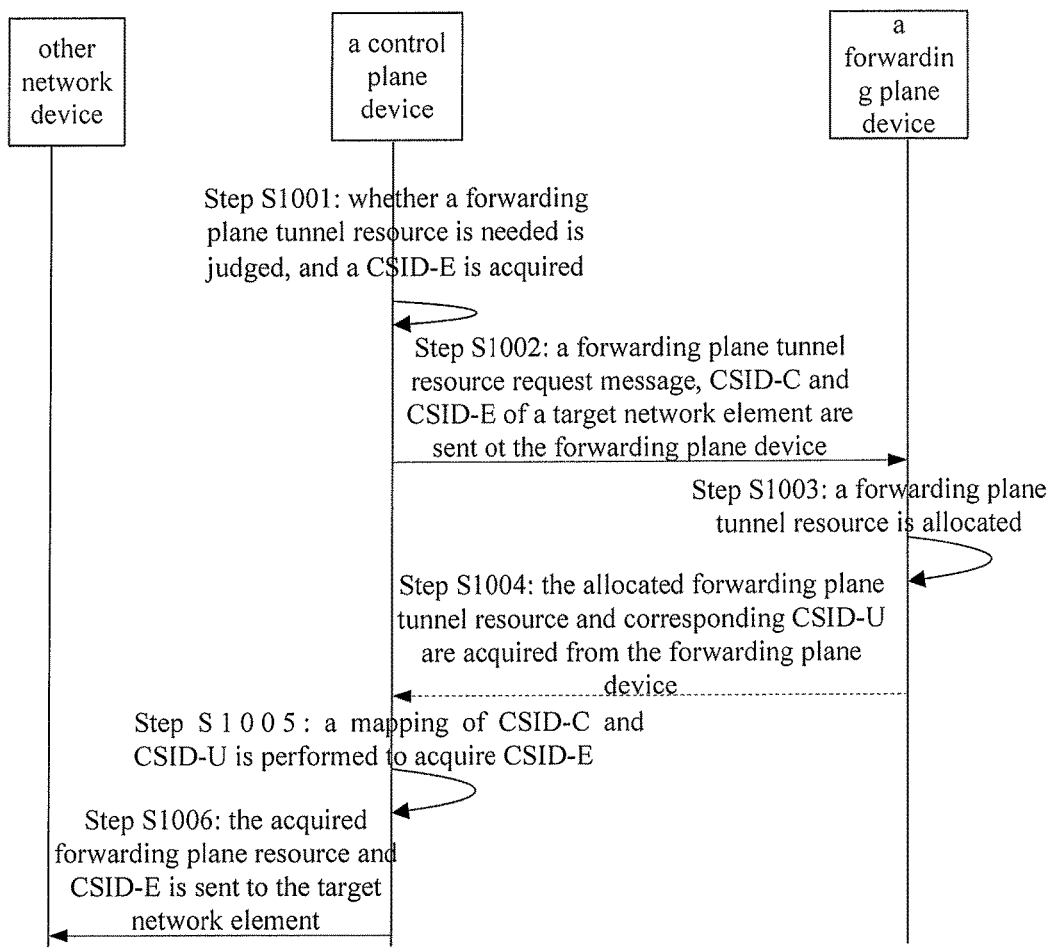
FIG. 10 is a schematic diagram of a flow of establishing a packet data network connection in a method for managing a forwarding plane tunnel resource under a control and forwarding decoupled architecture in a second embodiment of the present invention.

FIG. 10 is a schematic diagram of a flow of establishing a packet data network connection in a method for managing a forwarding plane tunnel resource under a control and forwarding decoupled architecture in the second embodiment of the present invention. The implementation scenario of the flow is the same as that of the first embodiment, and the flow of establishing the packet data network connection in the embodiment as shown in FIG. 10 includes the following steps.

Step S1001 to step S1003 are the same as S501 to S503 in the first embodiment, and will not be repeated redundantly herein.

Step S1004: the control plane device acquires the allocated forwarding plane tunnel resource and a forwarding plane device circuit switched identifier CSID-U corresponding to the allocated forwarding plane tunnel resource from the forwarding plane device.

Step S1005: the control plane device performs a mapping of the forwarding plane device circuit switched identifier corresponding to the forwarding plane tunnel resource and the control plane device circuit switched identifier to acquire an external using circuit switched identifier corresponding to the forwarding plane tunnel resource. Namely, the control plane device performs a mapping of the CSID-C and the CSID-U corresponding to the forwarding plane tunnel resource to acquire a CSID-E.

Step S1006: the control plane device sends the external using circuit switched identifier corresponding to the forwarding plane tunnel resource to a target network element, to establish a packet data network connection with the target network element.

In the embodiment of the present invention, the failure processing method in the case of failure of the control plane device or the target network element is the same as that in the first embodiment, which will not described repeatedly in the embodiment. In the embodiment, the forwarding plane device independently maintains its own CSID-U, so that when the forwarding plane device fails, a failure processing may be performed in the following flow.

Figure 11:
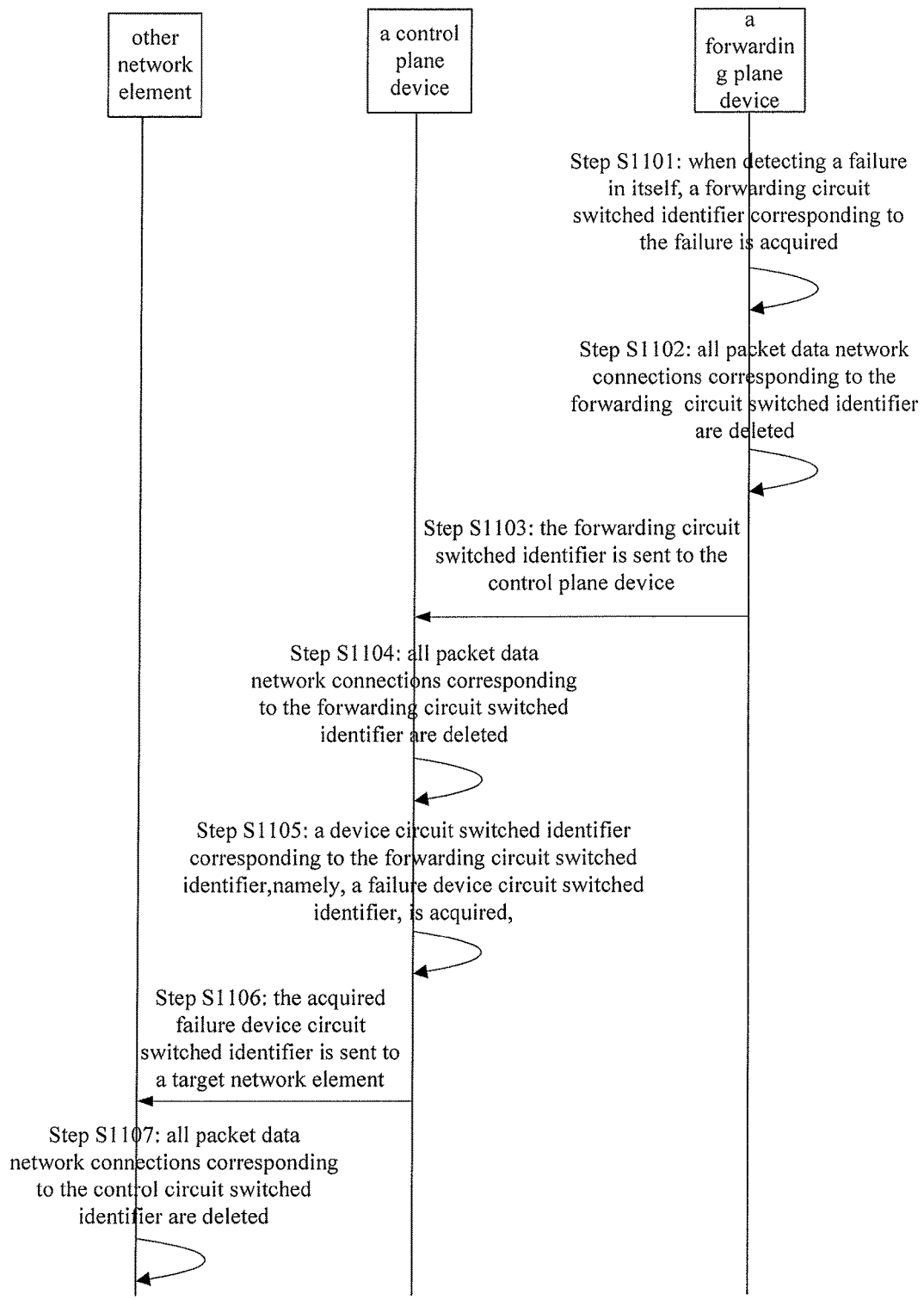
FIG. 11 is a schematic diagram of a flow of a failure processing method in the case of a failure occurred in a forwarding plane device in a second embodiment of the present invention.

FIG. 11 is a schematic diagram of a flow of a failure processing method in the case of a failure occurred in a forwarding plane device in the second embodiment of the present invention, as shown in the figure, the flow may include the following steps.

Step S1101: a forwarding plane device acquires, when detecting a failure in itself, a forwarding plane device circuit switched identifier corresponding to the failure. The CSID-U corresponds to a certain GTP protocol processing unit or a PMIP protocol processing unit in the forwarding plane device, for example, may correspond to a cabinet, a frame, a single board, a CPU, a certain core, process or thread of a multi-core CPU and the like. When these protocol processing units in the forwarding plane device fail, the forwarding plane device may acquire the CSID-U corresponding to the failure.

Step S1102: the forwarding plane device deletes all packet data network connections corresponding, to the forwarding plane device circuit switched identifier corresponding to the failure.

Step S1103: the forwarding plane device sends the forwarding plane device circuit switched identifier corresponding to the failure to the control plane device.

Step S1104: the control plane device deletes all packet data network connections corresponding to the forwarding plane device circuit switched identifier corresponding to the failure.

Step S1105, the control plane device acquires an external using circuit switched identifier corresponding to the forwarding plane device circuit switched identifier corresponding to the failure, namely, a failure external using circuit switched identifier. The CSID-E in the embodiment is acquired by the control plane device by performing a mapping of the CSID-C and CSID-U corresponding to the same forwarding plane tunnel resource, so that when acquiring the forwarding plane device circuit switched identifier corresponding to the failure occurred in the forwarding plane device, the control plane device may acquire the CSID-E corresponding to the CSID-U.

Step S1106: the control plane device sends the failure external using circuit switched identifier to a target network element associated with the failure external using circuit switched identifier. The control plane device may firstly search the target network element of the packet data network connection, established by using the CSID-E corresponding to the failure, namely, the target network element associated with the CSID-E corresponding to the failure, and then send the failure external using circuit switched identifier to the associated target network element.

Step S1107: the target network element deletes all packet data network connections corresponding to the failure external using circuit switched identifier.

In other embodiment, the sequence of the three groups of steps, namely step S1102, step S1103 to step S1104, and step S1105 to step S1107 may be mutually exchanged randomly without influencing the implementation effect of the present invention.

Figure 12:
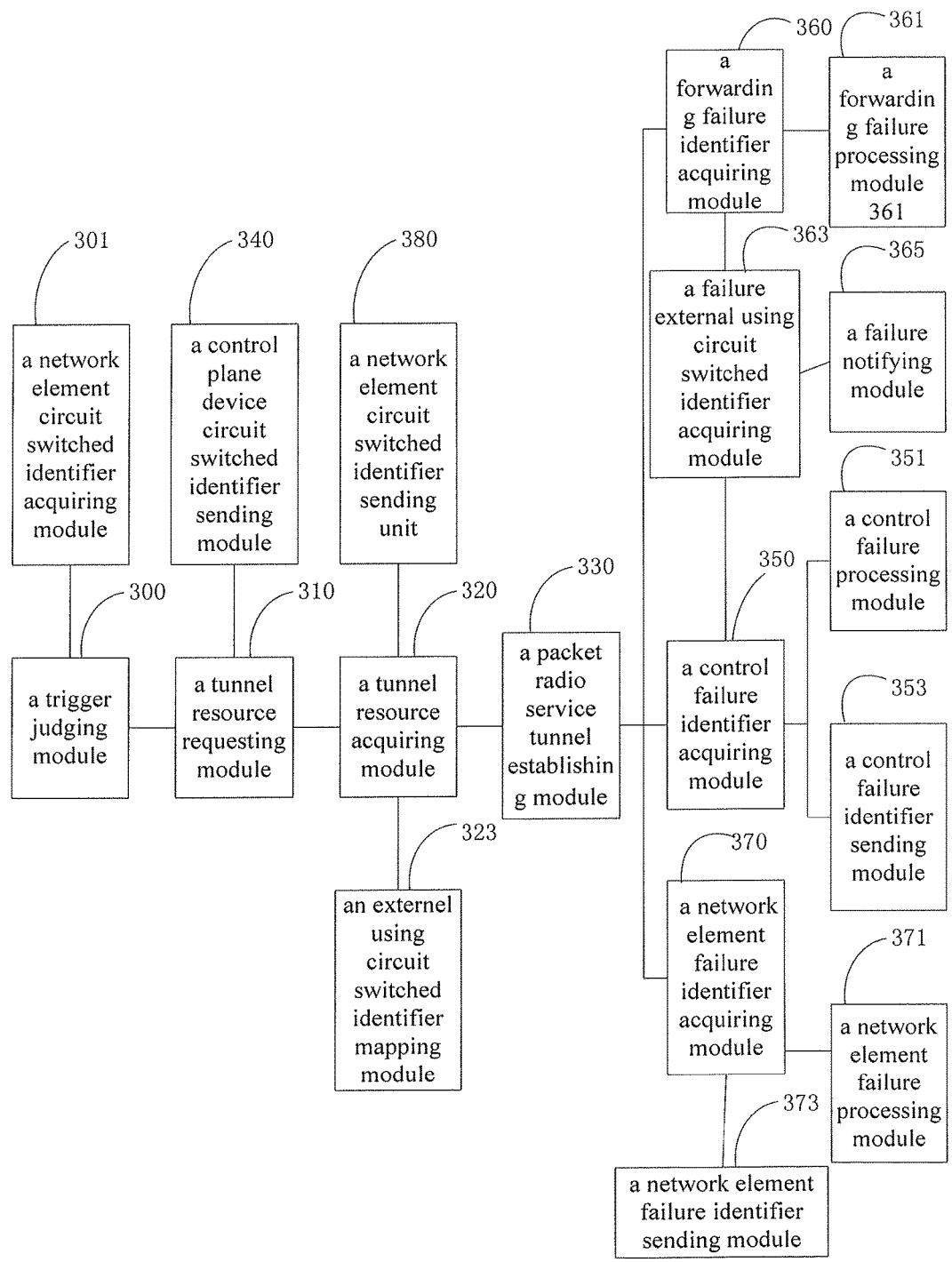
FIG. 12 is a schematic diagram of a structure of a control plane device for managing a forwarding plane tunnel resource in a third embodiment of the present invention.

FIG. 12 is a schematic diagram of a structure of a control plane device for managing a forwarding plane tunnel resource in a third embodiment of the present invention. The control plane device in the embodiment may be implemented, under a control and forwarding decoupled architecture, in a radio network controller (RNC), an SGSN and a GGSN in a GPRS network, or an evolved node B (eNodeB), an S-GW, a P-GW and an integrated device of the S-GW and the P-GW in an evolved packet system (EPS) network, or any control and forwarding decoupled GTP, proxy mobile IPv6 (PMIP, including a local mobility anchor LMA, Local Mobility Anchor and a mobile access gateway MAG; Mobile Access Gateway) protocol processing entirety, and even may be completely separated from the forwarding plane device, for example, being singly achieved in an MME. The control plane device in the embodiment as shown in FIG. 12 may include the following modules.

A forwarding plane information acquiring module 510 is configured to acquire a set of forwarding plane tunnel resources of a forwarding plane device, and optionally may also configured to acquire a forwarding plane device circuit switched identifier and the processing ability of the forwarding plane device of each forwarding plane device corresponding to the set of forwarding plane tunnel resources. In specific implementation, after a connection is successfully established between the control plane device and the forwarding plane device, the control plane device acquires the set of forwarding plane tunnel resources of the forwarding plane device, corresponding CSID-Us and the processing ability of the forwarding plane device from the forwarding plane device, which may be actively acquired by the control plane device or actively reported by the forwarding plane device. The trigger manner may be periodic acquisition or report, or the one that the control plane device is triggered to acquire as needed or the forwarding plane device is notified to report and the like. For a GTP protocol, the set of forwarding plane tunnel resources may be determined by a forwarding plane IP interval and a TEID interval, wherein the TEID interval may be determined in such manners as initial TEID or TEID+mask and the like. For a PMIP protocol, the set of forwarding plane tunnel resources may be determined by a forwarding plane IP interval and a GRE Key interval, wherein the GRE Key interval may be determined in such manners as initial GRE Key or GRE Key+ mask and the like. Each forwarding plane tunnel resource may correspond to a forwarding plane device circuit switched identifier CSID-U. The processing ability of the forwarding plane device indicates the maximal number of GTP tunnels or PMIP sessions capable of being simultaneously processed by a protocol processing unit corresponding to each CSID-U in the forwarding plane device, and the number may be smaller than or equal to the size of the TEID interval or GRE Key interval. For example, the protocol processing unit corresponding to a CSID-U may simultaneously process 10K GTP tunnels, and to avoid quick circulation of the TEID, the TEID interval of 1M may be allocated. If the processing ability corresponding to the CSID-U is the same as the size of the TEID interval, the processing ability of the forwarding plane device may be omitted, and only the set of forwarding plane tunnel resources and the forwarding plane device circuit switched identifiers of the forwarding plane device are acquired.

A tunnel resource allocating module 520 is configured to allocate a forwarding plane tunnel resource according to the acquired set of forwarding plane tunnel resources. In specific implementation, the tunnel resource allocating module 520 may allocate a proper forwarding plane tunnel resource in the acquired set of forwarding plane tunnel resources according to demand, and optionally, the tunnel resource allocating module 520 may further be configured to acquire the forwarding plane device circuit switched identifier corresponding to the allocated forwarding plane tunnel resource.

A packet radio service tunnel establishing module 530 is configured to send the allocated forwarding plane tunnel resource to a target network element, to establish a packet data network connection PDN connection with the target network element.

Furthermore, the control plane device may further include a trigger judging module 500, configured to judge whether the forwarding plane tunnel resource needs to be allocated or not according to an external or internal trigger condition. Specifically, the external trigger condition may be that the control plane device is triggered by a signaling negotiation such as external GTP-C, PMIP, PCC or the like, and the internal trigger condition is that the control plane device is triggered inside a network element device where the control plane device is located. When the trigger judging module 500 judges that the external or internal trigger condition is satisfied, the tunnel resource allocating module 520 allocates a forwarding plane tunnel resource corresponding to the satisfied trigger condition, according to the satisfied trigger condition. For example, the satisfied trigger condition is an external GTP-C signaling negotiation, then the tunnel resource allocating module 520 needs to allocate a corresponding GTP tunnel. If the satisfied trigger condition is an external PMIP signaling negotiation, then the tunnel resource allocating module 520 needs to allocate a PMIPv6 session.

Optionally, the control plane device in the embodiment may further include the following modules.

A control failure identifier acquiring module 550 is configured to acquire, when detecting a failure occurs in its own device, a control plane device circuit switched identifier corresponding to the failure, wherein the CSID-C corresponds to a certain GTP protocol processing unit or a PMIP protocol processing unit in the control plane device, for example, it may correspond to a cabinet, a frame, a single board, a CPU, a certain core, process or thread of a multicore CPU and the like.

A control failure processing module 551 is configured to delete all packet data network connections corresponding to the control plane device circuit switched identifier corresponding to the failure.

Optionally, the control plane device in the embodiment may further include the following modules.

A forwarding failure identifier acquiring module 560 is configured to acquire, when the forwarding plane device fails, a forwarding plane device circuit switched identifier corresponding to the failure from the forwarding plane device.

A forwarding failure processing module 561 is configured to delete all packet data network connections corresponding to the forwarding plane device circuit switched identifier corresponding to the failure of the forwarding plane device.

Optionally, the packet radio service tunnel establishing module 530 is further configured to send an external using circuit switched identifier (for convenience of description, CSID-E is configured to express the external using circuit switched identifier hereafter) corresponding to the forwarding plane tunnel resource to the target network element. In the embodiment, the CSID-E sent by the packet radio service tunnel establishing module 530 to the target network element is acquired by a circuit switched identifier mapping module 523 by perform a mapping. In other embodiment, the CSID-C may be used as CSID-E as well.

The circuit switched identifier mapping module 523 is configured to acquire a CSID-C corresponding to the forwarding plane tunnel resource request message of the control plane device and performs a mapping of the CSID-C corresponding to the forwarding plane tunnel resource and a CSID-U acquired by the tunnel resource acquiring module 520 to acquire a CSID-E corresponding to the forwarding plane tunnel resource.

And then, the control plane device may further include the following modules.

A failure external using circuit switched identifier acquiring module 563 is configured to acquire, when the control failure identifier acquiring module 550 acquires the control plane device circuit switched identifier corresponding to the failure of the control plane device, an external using circuit switched identifier corresponding to the control plane device circuit switched identifier corresponding to the failure of the control plane device, or acquire, when the forwarding failure identifier acquiring module 560 acquires the forwarding plane device circuit switched identifier corresponding to the failure of the forwarding plane device, an external using circuit switched identifier corresponding to the forwarding plane device circuit switched identifier corresponding to the failure of the forwarding plane device, wherein the CSID-E in the embodiment is acquired by perform ing a mapping of the CSID-C and the CSID-U corresponding to the same forwarding plane tunnel resource, therefore, if the CSID-C or CSID-U corresponding to the failure is acquired, a unique CSID-E may be acquired. In other embodiment, the CSID-C may be used as CSID-E as well.

A failure notifying module 565 is configured to send the external using circuit switched identifier corresponding to the forwarding plane device circuit switched identifier corresponding to the failure of the forwarding plane device, acquired by the failure external using circuit switched identifier acquiring module 563, or the external using circuit switched identifier corresponding to the control plane device circuit switched identifier corresponding to the failure occurred in the control plane device, to the target network element associated with the failure external using circuit switched identifier. Specifically, the failure notifying module 565 may find out the target network element associated with the CSID-E according to the CSID-E acquired by the failure external using circuit switched identifier acquiring module 563, and then send the CSID-E to the associated target network element.

Optionally, the control plane device may further include:

A control plane device circuit switched identifier sending module 540, configured to send the control plane device circuit switched identifier corresponding to the allocated forwarding plane tunnel resource to the forwarding plane device.

And then, the control plane device may further include:

a control failure identifier sending module 553, configured to send the control plane device circuit switched identifier corresponding to the failure, which is acquired by the control failure identifier acquiring module 550, to the forwarding plane device, for enabling the forwarding plane device to delete all packet data network connections corresponding to the control plane device circuit switched identifier corresponding to the failure.

Optionally, the control plane device may further include:

a network element circuit switched identifier acquiring module 501, configured to acquire an external using circuit switched identifier of the target network element corresponding to the allocated forwarding plane tunnel resource. The network element circuit switched identifier acquiring module 501 may acquire the CSID-E of the target network element through a signaling negotiation with the target network element. In other embodiment, the network element circuit switched identifier acquiring module 501 may be integrated with the trigger judging module 500 in a module for implementation.

And then, the control plane device may further include the following modules.

a network element failure identifier acquiring module 570 is configured to acquire an external using circuit switched identifier corresponding to the failure occurred in the target network element, namely a failure external using circuit switched identifier of the target network element. When sending the failure, the target network element will send a CSID-E corresponding to the failure thereof to the control plane device, and the network element failure identifier acquiring module 570 receives the CSID-E sent by the target network element and corresponding to the failure thereof.

A network element failure processing module 571 is configured to delete all packet data network connections corresponding to the failure external using circuit switched identifier of the target network element.

Optionally, the control plane device may further include:

a network element circuit switched identifier sending unit 580, configured to send the external using circuit switched identifier of the target network element corresponding to the forwarding plane tunnel resource to the forwarding plane device.

And then, the control plane device may further include:

a network element failure identifier sending module 573, configured to send the failure external using circuit switched identifier of the target network element, acquired by the network element failure identifier acquiring module 570, to the forwarding plane device, for enabling the forwarding plane device to delete all the packet data network connections corresponding to the failure external using circuit switched identifier of the target network element.

Figure 13:
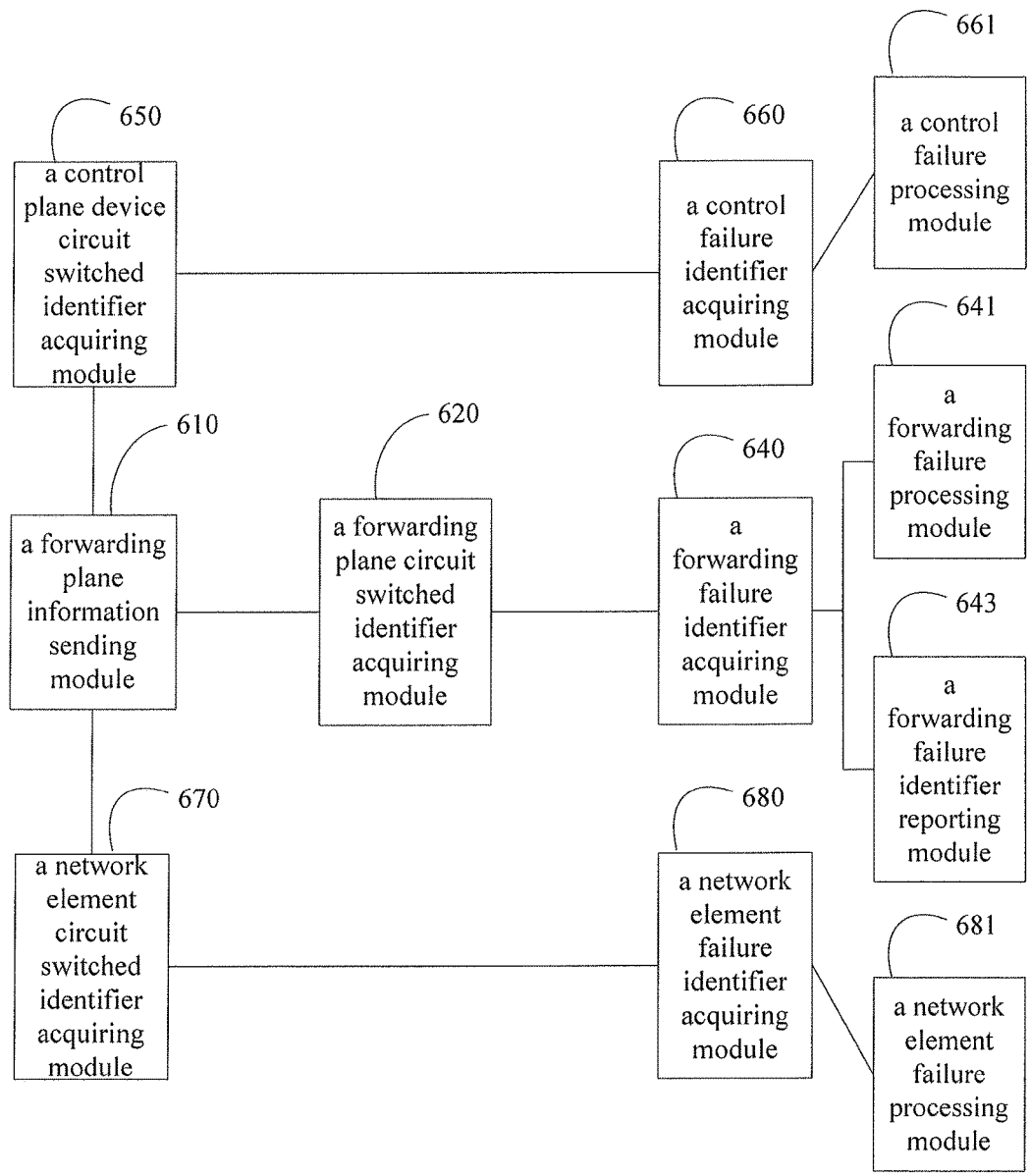
FIG. 13 is a schematic diagram of a structure of a forwarding plane device for managing a forwarding plane tunnel resource in a third embodiment of the present invention.

FIG. 13 is a schematic diagram of a structure of a forwarding plane device for managing a forwarding plane tunnel resource in a third embodiment of the present invention. The implementation scenario of the forwarding plane device in the embodiment is the same as that of the forwarding plane device in the first embodiment, and the forwarding plane device in the embodiment as shown in the figure may include:

a forwarding plane information sending module 610, configured to send a set of forwarding plane tunnel resources of the forwarding plane device to the control plane device, and optionally may also be configured to send a forwarding plane device circuit switched identifier of each forwarding plane device and the processing ability of the forwarding plane device corresponding to the set of forwarding plane tunnel resources. In specific implementation, after a connection is successfully established between the control plane device and the forwarding plane device, the control plane device acquires the set of forwarding plane tunnel resources, corresponding CSID-Us and the processing ability of the forwarding plane device from the forwarding plane device, which may be actively acquired by the control plane device or actively reported by the forwarding plane device. The trigger manner may be periodic acquisition or report, or the one that the control plane device is triggered to acquire as needed or the forwarding plane device is notified to report and the like. For a GTP protocol, the set of forwarding plane tunnel resources may be determined by a forwarding plane IP interval and a TEID interval, wherein the TEID interval may be determined in such manners as initial TEID or TEID+mask and the like. For a PMIP protocol, the set of forwarding plane tunnel resources may be determined by a forwarding plane IP interval and a GRE Key interval, wherein the GRE Key interval may be determined in such manners as initial GRE Key or GRE Key+mask and the like. Each forwarding plane tunnel resource may correspond to a forwarding plane device circuit switched identifier CSID-U. The processing ability of the forwarding plane device indicates the maximal number of GTP tunnels or PMIP sessions capable of being simultaneously processed by a protocol processing unit corresponding to each CSID-U in the forwarding plane device, and the number may be smaller than or equal to the size of the TEID interval or GRE Key interval. For example, the protocol processing unit corresponding to a CSID-U may simultaneously process 10K GTP tunnels, and to avoid quick circulation of the TEID, the TEID interval of 1M may be allocated. If the processing ability corresponding to the CSID-U is the same as the size of the TEID interval, the processing ability of the forwarding plane device may be omitted, and the forwarding plane information sending module 610 only sends the set of forwarding plane tunnel resources and the forwarding plane device circuit switched identifiers of the forwarding plane device.

Optionally, the forwarding plane device in the embodiment may further include the following modules.

A control plane device circuit switched identifier acquiring module 650 is configured to acquire the allocated forwarding plane tunnel resource and a corresponding control plane device circuit switched identifier from the control plane device. In this way, the forwarding plane device learns about the control plane device circuit switched identifier corresponding to its own allocated forwarding plane tunnel resource.

A network element circuit switched identifier acquiring module 670 is configured to acquire an external using circuit switched identifier of the target network element corresponding to the allocated forwarding plane tunnel resource from the control plane device. In this way, the forwarding plane device learns about the external using circuit switched identifier of the target network element corresponding to its own allocated forwarding plane tunnel resource. Furthermore, in other optional embodiment, a forwarding plane circuit switched identifier acquiring module 620, the control plane device circuit switched identifier acquiring module 650 and the network element circuit switched identifier acquiring module 670 may be integrated in a module for implementation.

And then, a forwarding failure identifier acquiring module 640, a forwarding failure processing module 641, a forwarding failure identifier reporting module 643, a control failure identifier acquiring module 660, a control failure processing module 661, a network element failure identifier acquiring module 680 and a network element failure processing module 681 are the same as the corresponding modules in the forwarding plane device of the second embodiment, and will not be repeated in the embodiment.

Figure 14:
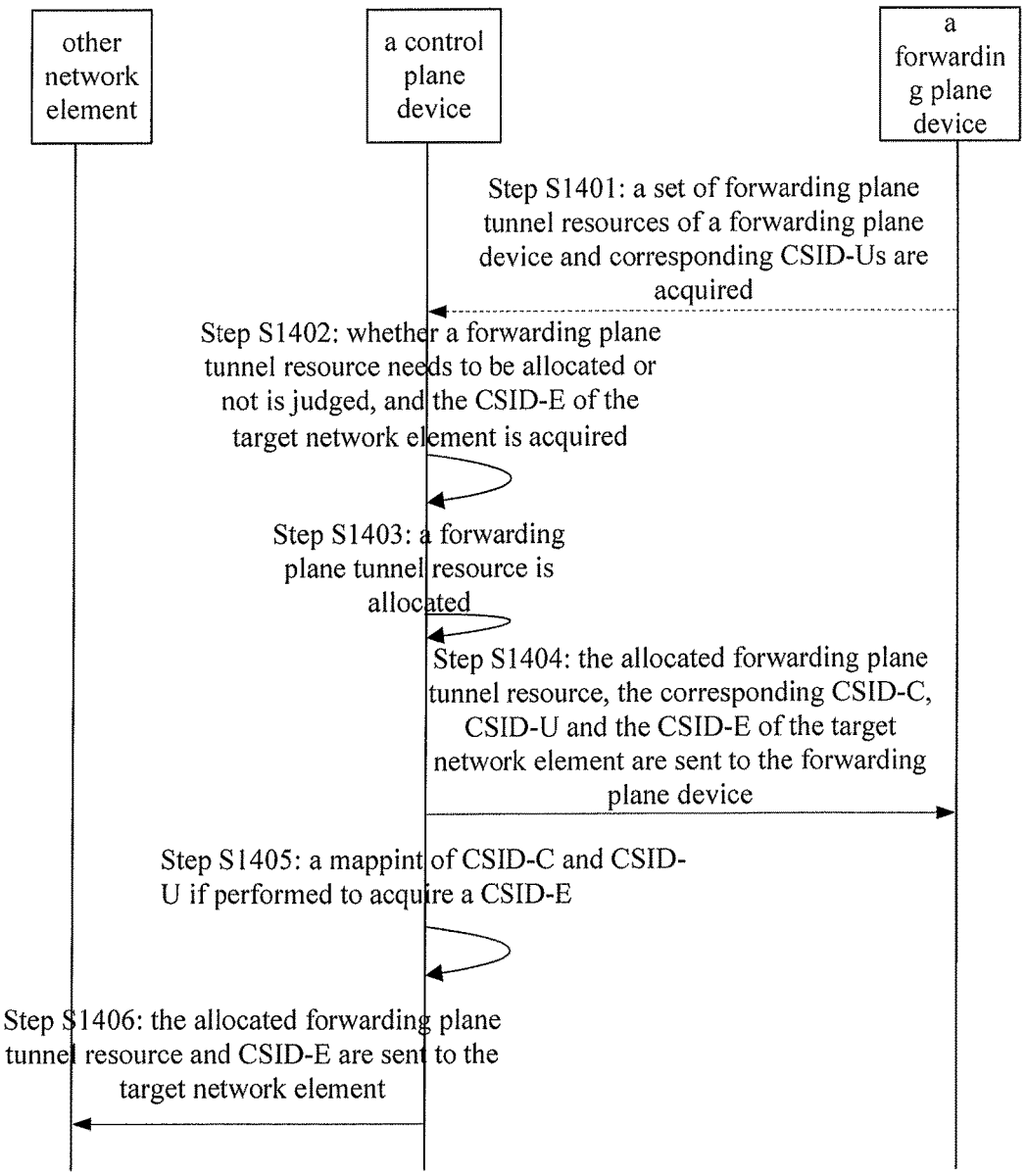
FIG. 14 is a schematic diagram of a flow of establishing a packet data network connection in a method for managing a forwarding plane tunnel resource under a control and forwarding decoupled architecture in a third embodiment of the present invention.

FIG. 14 is a schematic diagram of a flow of establishing a packet data network connection in a method for managing a forwarding plane tunnel resource under a control and forwarding decoupled architecture in a third embodiment of the present invention. The implementation scenario of the flow is the same as that in the first embodiment. The flow of establishing the packet data network connection in the embodiment as shown in FIG. 14 includes the following steps.

Step S1401: a set of forwarding plane tunnel resources of a forwarding plane device is acquired. Optionally, a forwarding plane device circuit switched identifier of each forwarding plane device and the processing ability of the forwarding plane device corresponding to the set of forwarding plane tunnel resources are acquired. In specific implementation, after a connection is successfully established between the control plane device and the forwarding plane device, the control plane device acquires the set of forwarding plane tunnel resources, corresponding CSID-Us and the processing ability of the forwarding plane device from the forwarding plane device, which may be actively acquired by the control plane device or actively reported by the forwarding plane device. The trigger manner may be periodic acquisition or report, or the one that the control plane device is triggered to acquire as needed or the forwarding plane device is notified to report and the like. For a GTP protocol, the set of forwarding plane tunnel resources may be determined by a forwarding plane IP interval and a TEID interval, wherein the TEID interval may be determined in such manners as initial TEID or TEID+mask and the like. For a PMIP protocol, the set of forwarding plane tunnel resources may be determined by a forwarding plane IP interval and a GRE Key interval, wherein the GRE Key interval may be determined in such manners as initial GRE Key or GRE Key+mask and the like. Each forwarding plane tunnel resource may correspond to a forwarding plane device circuit switched identifier CSID-U. The processing ability of the forwarding plane device indicates the maximal number of GTP tunnels or PMIP sessions capable of being simultaneously processed by a protocol processing unit corresponding to each CSID-U in the forwarding plane device, and the number may be smaller than or equal to the size of the TEID interval or GRE Key interval. For example, the protocol processing unit corresponding to a CSID-U may simultaneously process 10K GTP tunnels, and to avoid quick circulation of the TEID, the TEID interval of 1M may be allocated. If the processing ability corresponding to the CSID-U is the same as the size of the TEID interval, the processing ability of the forwarding plane device may be omitted, and only the set of forwarding plane tunnel resources of the forwarding plane device and the forwarding plane device circuit switched identifiers are acquired.

Step S1402: the control plane device judges, according to an external or internal trigger condition, whether a forwarding plane tunnel resource needs to be allocated or not, and when judging the external or internal trigger condition is satisfied, an external using circuit switched identifier corresponding to the forwarding plane tunnel resource request message is acquired. Specifically, the external trigger condition may be that the control plane device is triggered by such signaling negotiation as external GTP-C, PMIP, PCC or the like, and the internal trigger condition is that the control plane device is triggered inside a network element device where the control plane device is located. In other embodiments, the acquiring the CSID-E of the target network element may be implemented at any moment after step S1402 by performing a signaling negotiation with the target network element.

S1403: when the control plane device judges the external or internal trigger condition is satisfied, a forwarding plane tunnel resource corresponding to the satisfied trigger condition may be allocated according to the satisfied trigger condition and the set of forwarding plane tunnel resources acquired in step S1401. For example, the satisfied trigger condition is an external GTP-C signaling negotiation, then the control plane device correspondingly allocates a corresponding GTP tunnel. If the satisfied trigger condition is an external PMIP signaling negotiation, then the control plane device correspondingly allocates a PMIPv6 session.

Step S1404: the control plane device sends the allocated forwarding plane tunnel resource, the corresponding control plane device circuit switched identifier, the forwarding plane device circuit switched identifier and the external using circuit switched identifier of the target network element to the forwarding plane device, so as to notify the forwarding plane device of the CSID-U and CSID-C, which are corresponding to the allocated forwarding plane tunnel resource, and the CSID-E of the target network element.

Step S1405: a mapping of the forwarding plane device circuit switched identifier and the control plane device circuit switched identifier corresponding to the allocated forwarding plane tunnel resource is performed to acquire an external using circuit switched identifier corresponding to the allocated forwarding plane tunnel resource. Optionally, when the forwarding plane device does not independently maintain its own CSID-U, the CSID-C of the control plane device may be directly adopted as CSID-E as well.

Step S1046: the allocated forwarding plane tunnel resource and the external using circuit switched identifier corresponding to the allocated forwarding plane tunnel resource are sent to the target network element, to establish a packet data network connection with the target network element.

In the embodiment, the flow of the failure processing method in the case of a failure of the control plane device or the target network element is the same as that in the first embodiment, and the failure processing method in the case of a failure of the forwarding plane device is the same as that in the second embodiment, and will not be repeated redundantly herein.

In the embodiment of the present invention, the load balancing of the forwarding plane device is achieved, and the signaling interaction between the control plane device and the forwarding plane device is reduced as much as possible, and meanwhile, the control plane device maintains its own CSID-C by means of reasonable allocation of the forwarding plane tunnel resources, thus efficient failure processing can be achieved in the case of device failure.

Those of ordinary skill in the art may understand that all or a part of the procedures in the above-mentioned embodiments of a method may be implemented with a computer program instructing relevant hardware, the foregoing program may be stored in a computer readable storage medium, and when being executed, the program may include the flows of the embodiments of the above-mentioned methods, wherein the storage medium may be a magnetic disk, an optical disk, a read-only memory (ROM), a random access memory (RAM) or the like.

The foregoing descriptions are merely preferred embodiments of the present invention, but the protection scope of the present invention is not limited thereto. Those of ordinary skill in the art should understand that realization for all or part of flows in the above-mentioned embodiments and the equivalent variations made according to the claims of the present invention still fall in the scope encompassed by the present invention.

What is claimed is:

1. A method for managing a forwarding plane tunnel resource under a architecture in which a control plane and a forwarding plane are decoupled, comprising:
    sending, by a control plane device, a forwarding plane tunnel resource request message to a forwarding plane device;
    acquiring, by the control plane device, the allocated forwarding plane tunnel resource from the forwarding plane device, wherein the acquired forwarding plane tunnel resource is allocated by the forwarding plane device in response to the forwarding plane tunnel resource request message; and
    sending, by the control plane device, the acquired forwarding plane tunnel resource to a target network element, to establish a packet data network connection with the target network element.

2. The method of claim 1, further comprising:
    sending, by the control plane device, an external using circuit switched identifier corresponding to the forwarding plane tunnel resource to the target network element.

3. The method of claim 2, before the sending, by the control plane device, an external using circuit switched identifier corresponding to the forwarding plane tunnel resource to the target network element, further comprising:
    acquiring, by the control plane device, a forwarding plane device circuit switched identifier of the forwarding plane device, which corresponds to the forwarding plane tunnel resource;
    acquiring, a control plane device circuit switched identifier of the control plane device, which corresponds to the forwarding plane tunnel resource request message; and
    performing a mapping of the forwarding plane device circuit switched identifier and the control plane device circuit switched identifier, which corresponds to the forwarding plane tunnel resource, to acquire the external using circuit switched identifier corresponding to the forwarding plane tunnel resource.

4. A control plane device, the control plane device comprising:
    a transmitter, configured to send a forwarding plane tunnel resource request message to a forwarding plane device; and
    a receiver, configured to acquire the allocated forwarding plane tunnel resource from the forwarding plane device, wherein the acquired forwarding plane tunnel resource is allocated by the forwarding plane device in response to the forwarding plane tunnel resource request message,
    wherein the transmitter is further configured to send the acquired forwarding plane tunnel resource to a target network element, to establish a packet data network connection with the target network element.

5. The control plane device of claim 4, wherein transmitter is further configured to send an external using circuit switched identifier corresponding to the forwarding plane tunnel resource to the target network element.

6. The control plane device of claim 5, wherein the receiver is further configured to acquire a forwarding plane device circuit switched identifier of the forwarding plane device, which corresponds to the forwarding plane tunnel resource, and the control plane device further comprises:
a processor, configured to acquire a control plane device circuit switched identifier of the control plane device, which corresponds to the forwarding plane tunnel resource request message, and perform a mapping of the forwarding plane device circuit switched identifier and the control plane device circuit switched identifier corresponding to the forwarding plane tunnel resource to acquire an external using circuit switched identifier corresponding to the forwarding plane tunnel resource.

7. The control plane device of claim 4, wherein the receiver is further configured to acquire an external using switched identifier of the target network element, which corresponds to the forwarding plane tunnel resource.

8. A forwarding plane device, comprising:
a receiver, configured to acquire a forwarding plane tunnel resource request message sent by a control plane device, wherein a control plane and a forwarding plane are decoupled;
a processor, configured to allocate a forwarding plane tunnel resource according to the forwarding plane tunnel resource request message; and
a transmitter, configured to send the allocated forwarding plane tunnel resource to the control plane device, for enabling the control plane device to send the forwarding plane tunnel resource to a target network element to establish a packet data network connection with the target network element.

9. The forwarding plane device of claim 8, wherein the transmitter is further configured to send a forwarding plane device circuit switched identifier corresponding to the forwarding plane tunnel resource to the control plane device.

10. The forwarding plane device of claim 9, wherein the transmitter sending the allocated forwarding plane tunnel resource and the forwarding plane device circuit switched identifier corresponding to the forwarding plane tunnel resource to the control plane device, for enabling the control plane device to send the forwarding plane tunnel resource to the target network element, further comprises: enabling the control plane device to send an external using circuit switched identifier corresponding to the forwarding plane tunnel resource to the target network element.

11. The forwarding plane device of claim 8, wherein the receiver is further configured to acquire an external using circuit switched identifier of the target network element from the control plane device.

12. The method of claim 1, wherein before the sending, by the control plane device, the forwarding plane tunnel resource request message to the forwarding plane device, the method further comprising:
judging, by the control plane device, according to an external or internal trigger condition, whether the forwarding plane tunnel resource needs to be allocated; and
when the external or internal trigger condition is satisfied, sending, by the control plane device, the forwarding plane tunnel resource request message to the forwarding plane device according to the satisfied trigger condition.

13. The control plane device of claim 4, the control plane device further comprising:
a processor, configured to judge, according to an external or internal trigger condition, whether the forwarding plane tunnel resource needs to be allocated or not, wherein when the processor judges that the external or internal trigger condition is satisfied, the transmitter sends the forwarding plane tunnel resource request message to the forwarding plane device according to the satisfied trigger condition, for enabling the forwarding plane device to allocate the forwarding plane tunnel resource corresponding to the satisfied trigger condition.

* * * * *